United States Patent
Wu et al.

(10) Patent No.: US 9,801,199 B2
(45) Date of Patent: Oct. 24, 2017

(54) METHOD AND DEVICE FOR DEVICE-TO-DEVICE COMMUNICATION AND DEVICE FOR CONTROLLING DEVICE-TO-DEVICE COMMUNICATION

(71) Applicant: ZTE Corporation, Shenzhen (CN)

(72) Inventors: Shuanshuan Wu, Shenzhen (CN); Yifei Yuan, Shenzhen (CN); Bo Dai, Shenzhen (CN); Shuanghong Huang, Shenzhen (CN); Youxiong Lu, Shenzhen (CN)

(73) Assignee: XI'AN ZHONGXING NEW SOFTWARD CO. LTD, Xi'An (CN)

( * ) Notice: Subject to any disclaimer, the term of this patent is extended or adjusted under 35 U.S.C. 154(b) by 0 days.

(21) Appl. No.: 15/328,714

(22) PCT Filed: Mar. 31, 2015

(86) PCT No.: PCT/CN2015/075568
§ 371 (c)(1),
(2) Date: Jan. 24, 2017

(87) PCT Pub. No.: WO2015/184917
PCT Pub. Date: Dec. 10, 2015

(65) Prior Publication Data
US 2017/0215199 A1    Jul. 27, 2017

(30) Foreign Application Priority Data
Jul. 25, 2014   (CN) .......................... 2014 1 0360696

(51) Int. Cl.
H04W 48/16    (2009.01)
H04W 72/12    (2009.01)
(Continued)

(52) U.S. Cl.
CPC ....... H04W 72/1215 (2013.01); H04L 5/0012 (2013.01); H04W 8/005 (2013.01);
(Continued)

(58) Field of Classification Search
CPC combination set(s) only.
See application file for complete search history.

(56) References Cited

U.S. PATENT DOCUMENTS 8,121,097 B2 * 2/2012 Li .................. H04B 1/7143
                                                    370/337
2011/0321050 A1 * 12/2011 Ho ................. H04W 4/08
                                                    718/102
(Continued)

FOREIGN PATENT DOCUMENTS

CN     103139921 A    6/2013
CN     103327568 A    9/2013
(Continued)

OTHER PUBLICATIONS

International Search Report for corresponding Application No. PCT/CN2015/075568 filed on Mar. 31, 2015; Mail date May 26, 2015.

*Primary Examiner* — Cindy Trandai
(74) *Attorney, Agent, or Firm* — Cantor Colburn LLP

(57) ABSTRACT

A method and device for device-to-device communication and a device for controlling device-to-device communication are provided. The method includes: a position of a first resource included in the Device-to-Device (D2D) resources in a D2D resource period is determined; a position of a second resource is determined according to the position of the first resource and a predefined hopping rule, and a D2D signal is sent on physical resources corresponding to the first resource and the second resource or on a physical resource corresponding to the second resource.

19 Claims, 10 Drawing Sheets

(51) Int. Cl.
*H04L 5/00* (2006.01)
*H04W 8/00* (2009.01)
H04L 5/14 (2006.01)
H04W 48/12 (2009.01)

(52) U.S. Cl.
CPC ........... *H04W 48/16* (2013.01); *H04L 5/1438* (2013.01); *H04W 48/12* (2013.01)

(56) References Cited

U.S. PATENT DOCUMENTS

| | | | | |
|---|---|---|---|---|
| 2012/0093098 A1* | 4/2012 | Charbit | ................. | H04W 72/04 370/329 |
| 2012/0163235 A1* | 6/2012 | Ho | ..................... | H04W 76/023 370/254 |
| 2013/0039203 A1* | 2/2013 | Fong | ..................... | H04B 7/024 370/252 |
| 2013/0044685 A1* | 2/2013 | Fong | ................... | H04J 11/0053 370/328 |
| 2013/0109301 A1* | 5/2013 | Hakola | ................ | H04W 76/023 455/39 |
| 2013/0308551 A1* | 11/2013 | Madan | ................ | H04W 76/023 370/329 |
| 2014/0003262 A1* | 1/2014 | He | ........................ | H04W 28/08 370/252 |
| 2015/0215763 A1* | 7/2015 | Ro | ........................ | H04W 8/005 455/426.1 |
| 2015/0215903 A1* | 7/2015 | Zhao | ..................... | H04W 72/04 370/329 |
| 2016/0269887 A1* | 9/2016 | Kim | ..................... | H04W 72/02 |
| 2016/0302053 A1* | 10/2016 | Park | ................. | H04W 72/0446 |
| 2017/0142692 A1* | 5/2017 | Kim | ................... | H04W 72/042 |

FOREIGN PATENT DOCUMENTS

| | | |
|---|---|---|
| CN | 103338497 A | 10/2013 |
| CN | 103347246 A | 10/2013 |
| CN | 103457690 A | 12/2013 |

* cited by examiner

METHOD AND DEVICE FOR DEVICE-TO-DEVICE COMMUNICATION AND DEVICE FOR CONTROLLING DEVICE-TO-DEVICE COMMUNICATION

TECHNICAL FIELD

The disclosure relates to the field of communications, and in particular to a method and device for device-to-device communication and a device for controlling the device-to-device communication.

BACKGROUND

As mobile communication services become increasingly diversified, for example, applications of social networks and e-payment using in radio communication systems become more and more popular, demands for service transmission between adjacent users increase continuously. With a capability of reducing a power consumption of a user terminal and improving spectrum efficiency, Device-to-Device (D2D) communication for adjacent users is getting more and more attention. FIG. 1 is a schematic diagram illustrating the D2D communication between two user equipments. As shown in FIG. 1, the D2D communication, which is also called Proximity Service (ProSe), refers to a direct transmission of service data from a source user equipment (UE) to a target UE via an air interface, without forwarding by a base station or a core network. For near field communication users, D2D can not only save radio spectrum resources but also reduce the data transmission workload of the core network.

In cellular communications, when two UEs are communicating with each other, generally each UE is incapable of sensing a location of the opposite UE by itself, therefore, a connection is established between the two UEs through a network-side device (e.g. a base station or a device of a core network). For the D2D communication, a premise of establishment of a communication link lies in a mutual discovery of UEs. Because D2D communication has a half-duplex characteristic which is reflected in discovery as follows: a UE is incapable of receiving a discovery signal after sending the discovery signal or sending a discovery signal after receiving the discovery signal. Thus, when two UEs respectively send the discovery signal at the same time, the UEs cannot be discovered by each other, which limits a application of D2D communication.

Thus, because of a half-duplex characteristic of the D2D communication which disenables UEs synchronously sending the discovery signal to be discovered by each other, D2D communication is limited in application.

SUMMARY

Embodiments of disclosure provide a method and device for device-to-device communication and a device for controlling the device-to-device communication, so as at least to solve above-mentioned problem.

In an embodiment of the disclosure, a method for device-to-device communication is provided.

According to the embodiment of the disclosure, the method for device-to-device communication includes: determining a position of a first resource included in Device-to-Device (D2D) resources in a D2D resource period; determining a position of a second resource according to the position of the first resource and a predefined hopping rule, wherein the predefined hopping rule includes at least one of the following rules: an inter-group hopping rule for establishing a D2D resource between D2D resource groups in the D2D resource period, and an inter-period hopping rule for establishing a D2D resource between adjacent D2D resource periods, wherein the D2D resource groups are obtained by dividing the D2D resources in each D2D resource period through at least one of the ways: time division multiplexing and frequency division multiplexing; and sending a D2D signal on physical resources corresponding to the first resource and the second resource or on a physical resource corresponding to the second resource.

In an example embodiment, at least one of the inter-group hopping rule and the inter-period hopping rule is as follows: according to at least one of a time domain position index and a frequency domain position index of a D2D resource before hopping, at least one of the time domain position index and the frequency domain position index of a D2D resource after hopping is calculated, wherein a principle corresponding to at least one of the inter-group hopping rule and the inter-period hopping rule includes at least one of the following principles of: executing a scattering process for D2D resources having the same time domain position index through a hopping processing; and executing a frequency hopping processing for the frequency domain position of a D2D resource through a hopping processing.

In an example embodiment, in a case where the predefined hopping rule includes the inter-group hopping rule, the first resource and the second resource are in the same D2D resource period, and the inter-group hopping rule is used for establishing a mapping relationship between resource positions of different D2D resource groups in the D2D resource period; when the D2D signal is to be sent in a plurality of D2D resource periods, at least one of the position of the first resource for sending the D2D signal in each of the plurality of D2D resource periods are the same and the position of the second resource for sending the D2D signal in each of the plurality of D2D resource periods are the same; or at least one of the position of the first resource and the position of the second resource is determined in each of the plurality of D2D resource periods.

In an example embodiment, in a case where the predefined hopping rule includes the inter-period hopping rule, the first resource and the second resource are in different periods, and the inter-period hopping rule is used for establishing a mapping relationship between D2D resource positions in adjacent D2D resource periods, wherein a D2D resource position is a physical resource position or a virtual resource position; in a case where the D2D resource position is a virtual resource position, at least one of the followings is executed: a physical resource position corresponding to the first resource is determined according to the position of the first resource and a predefined D2D resource mapping rule; and a physical resource position corresponding to the second resource is determined according to the position of the second resource and the predefined D2D resource mapping rule; and the adjacent D2D resource periods refer to D2D resource periods which are adjacent to each other in a time domain or D2D resource periods which are adjacent to each other in a time domain and in which the D2D signal is sent.

In an example embodiment, the predefined D2D resource mapping rule is used for determining a physical resource position according to a virtual resource position, and the predefined D2D resource mapping rule is one of the following rules:

$np(i)=i*\text{floor}(Np/Npg)+nv, kp(i)=kv;$ $np(i)=i*\text{floor}(Np/Npg)+nv, kp(i)=\text{mod}(i,2)*(Kp-kv-1)+\text{mod}(i+1,2)*kv;$ $np(i)=i*\text{floor}(Np/Npg)+nv, kp(i)=\text{mod}(\text{mod}(i,2)*\text{floor}(Kp/2)+kv, Kp);$ and $np(i)=i*\text{floor}(Np/Npg)+nv, kp(i)=\text{mod}(i*\text{floor}(Kp/NUM)+kv, Kp),$ wherein NUM is a number of physical resources which send D2D signals from the same D2D sending source in a resource period; i is an index of a physical resource and i=0, 1, 2, NUM−1; kp(i) and np(i) respectively represent a frequency domain position and a time domain position of a physical resource whose index is i; kv and nv respectively represent a frequency domain position and a time domain position of a virtual resource; Kp and Np respectively represent a number of frequency domain resources and a number of time domain resources of a physical resource for D2D communication in a resource period; and Npg represents a number of physical resources of a D2D resource group in a time domain.

In an example embodiment, in a case where the pre-defined hopping rule includes both of the inter-group hopping rule and the inter-period hopping rule, the inter-group hopping rule is used for establishing a mapping rule between resource positions of D2D resource groups that are adjacent in the time domain to each other in a D2D resource period, and the inter-period hopping rule is used for establishing a mapping rule between resource positions of D2D resource groups that are adjacent to each other in adjacent D2D resource periods; or, the inter-period hopping rule is used for establishing a mapping rule between resource positions of the first D2D resource groups in adjacent D2D resource periods, wherein the adjacent D2D resource periods refer to D2D resource periods which are adjacent to each other in the time domain or D2D resource periods which are adjacent to each other in the time domain and in which the D2D signal is sent.

In an example embodiment, the inter-group hopping rule is the same as the inter-period hopping rule.

In an example embodiment, the mapping relationship between the D2D resource units established according to at least one of the inter-group hopping rule and the inter-period hopping rule is one of the following mapping relationships:

$k2=\text{mod}(\text{floor}((n1*K+k1+A+C)/N), K), n2=\text{mod}(n1*K+k1+A+D, N)$ $k2=\text{mod}(k1*N+n1+B+C, K), n2=\text{mod}(\text{floor}((k1*N+n1+B+D)/K), N);$ $k2=\text{mod}(k1+M+E, K), n2=\text{mod}(n1+k1+L+F, N);$ $k2=K-k1-1$ or $k2=\text{mod}(K-k1-1+E, K), n2=\text{mod}(n1+k1+L+F, N);$ wherein frequency hopping is executed according to a type2 Physical Uplink Shared Channel (PUSCH) hopping way defined by a Long Term Evolution (LTE), and a way of time domain hopping is as follows: n2=mod(n1+k1+L+F, N); and unhopped frequency positions are interleaved using an interleaver and a frequency position of a D2D resource after hopping unit is obtained according to a result of interleaving, and a way of time domain hopping is as follows: n2=mod(n1+k1+L+F,N), wherein floor(a) represents a rounddown of a; mod(a,b) represents a modulo operation between a and b; n1 and k1 are respectively corresponding to a time position and a frequency position of a D2D resource before hopping; n2 and k2 are respectively corresponding to a time position and a frequency position of a D2D resource after hopping; N represents a number of D2D resources that are included in a D2D resource group or a D2D resource period in a direction of time; K represents a number of D2D resources that are included in a D2D resource group or a D2D resource period in a direction of frequency; A, B, C, D, E, F, M and L are all integers; and a position of the D2D resource is a physical resource position or a virtual resource position.

In an example embodiment, a number of the D2D resource groups in a D2D resource period is one of the followings: a preset number; a number indicated by a D2D configuration signaling sent by a network-side device; and a number determined according to times a D2D signal is sent repeatedly in a D2D resource period.

In an example embodiment, the D2D signal includes one of the following signals: a signal for transmitting a D2D discovery message; a signal for transmitting a D2D communication control signaling; a signal for transmitting D2D communication data; and a signal for transmitting D2D synchronization.

In an example embodiment, a way of determining the position of the first resource is one of the followings: receiving, from a network-side device, a control signaling for indicating the position of the first resource; randomly selecting the position of the first resource from a D2D resource set in a D2D resource period, wherein the D2D resource set is a part of or all of the D2D resource groups in the D2D resource period; receiving a control signaling sent from a network-side device and determining the position of the first resource according to the control signaling and the predefined hopping rule; determining the position of the first resource according to identification information of a User Equipment (UE); and indicating the position of the first resource using a D2D control signaling sent by another UE.

In an example embodiment, receiving, from the network-side device, the control signaling for indicating the position of the first resource includes: receiving a specific radio resource control signaling from the network-side device and determining the position of the first resource according to the specific radio resource control signaling, wherein the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

In an example embodiment, receiving the control signaling sent from the network-side device and determining the position of the first resource according to the control signaling and the predefined hopping rule includes: receiving a specific radio resource control signaling from the network-side device and determining the position of the first resource according to the specific radio resource control signaling, wherein the specific radio resource control signaling carries parameters for indicating a position of a specific D2D resource unit, the position of the specific D2D resource unit is a position of the specific D2D resource unit in a first D2D resource period, and the first D2D resource is indicated by configuration information, or the first D2D resource period is a D2D resource period for first sending the D2D signal; and determining the position of the first resource according to the position of the specific D2D resource unit in the first D2D resource period and the predefined hopping rule.

In another embodiment of the disclosure, a device for device-to-device communication is provided.

According to an embodiment of the disclosure, the device for device-to-device communication includes: a first determination component arranged to determine a position of a first resource included in the Device-to-Device (D2D) resources in a D2D resource period; a second determination component arranged to determine a position of a second resource according to the position of the first resource and a predefined hopping rule, wherein the predefined hopping rule includes at least one of the following rules: an inter-group hopping rule for establishing a D2D resource between D2D resource groups in the D2D resource period, and an inter-period hopping rule for establishing a D2D resource between adjacent D2D resource periods, wherein the D2D resource groups are obtained by dividing the D2D resources in each D2D resource period through at least one of the ways: time division multiplexing and frequency division multiplexing; and a sending component arranged to send a D2D signal on physical resources corresponding to the first resource and the second resource or on a physical resource corresponding to the second resource.

In an example embodiment, at least one of the inter-group hopping rule and the inter-period hopping rule is as follows: according to at least one of a time domain position index and a frequency domain position index of a D2D resource before hopping, at least one of the time domain position index and the frequency domain position index of a D2D resource after hopping is calculated, wherein a principle corresponding to at least one of the inter-group hopping rule and the inter-period hopping rule includes at least one of the following principles of: executing a scattering process for D2D resources having the same time domain position index through a hopping processing; and executing a frequency hopping processing for the frequency domain position of a D2D resource through a hopping processing.

In an example embodiment, in a case where the predefined hopping rule only includes the inter-group hopping rule, the first resource and the second resource are in the same D2D resource period, the inter-group hopping rule is used for establishing a mapping relationship between resource positions of different D2D resource groups in the D2D resource period; when the D2D signal is to be sent in a plurality of D2D resource periods, at least one of the position of the first resource for sending the D2D signal in each of the plurality of D2D resource periods are the same, and the position of the second resource for sending the D2D signal in each of the plurality of D2D resource periods are the same; or at least one of the position of the first resource and the position of the second resource is determined in each of the plurality of D2D resource periods.

In an example embodiment, in a case where the predefined hopping rule includes the inter-period hopping rule, the first resource and the second resource are in different periods, and the inter-period hopping rule is used for establishing a mapping relationship between D2D resource positions in adjacent D2D resource periods, wherein a D2D resource position is a physical resource position or a virtual resource position, in a case where the D2D resource position is a virtual resource position, at least one of the followings is executed: a physical resource position corresponding to the first resource is determined according to the position of the first resource and a predefined D2D resource mapping rule; and a physical resource position corresponding to the second resource is determined according to the position of the second resource and the predefined D2D resource mapping rule; and the adjacent D2D resource periods refer to D2D resource periods which are adjacent to each other in a time domain or D2D resource periods which are adjacent to each other in a time domain and in which the D2D signal is sent.

In an example embodiment, the predefined D2D resource mapping rule is used for determining a physical resource position according to a virtual resource position, and the predefined D2D resource mapping rule is one of the following rules:

$np(i)=i*\text{floor}(Np/Npg)+nv, kp(i)=kv;$ $np(i)=i*\text{floor}(Np/Npg)+nv, kp(i)=\text{mod}(i,2)*(Kp-kv-1)+\text{mod}(i+1,2)*kv;$ $np(i)=i*\text{floor}(Np/Npg)+nv, kp(i)=\text{mod}(\text{mod}(i,2)*\text{floor}(Kp/2)+kv, Kp);$ and $np(i)=i*\text{floor}(Np/Npg)+nv, kp(i)=\text{mod}(i*\text{floor}(Kp/\text{NUM})+kv, Kp),$ wherein NUM is a number of physical resources which send D2D signals from the same D2D sending source in a resource period; i is an index of a physical resource and i=0, 1, 2, NUM−1; kp(i) and np(i) respectively represent a frequency domain position and a time domain position of a physical resource whose index is i; kv and nv respectively represent a frequency domain position and a time domain position of a virtual resource; Kp and Np respectively represent a number of the frequency domain resources and a number of time domain resources of a physical resource for D2D communication in a resource period; and Npg represents a number of physical resources of a D2D resource group in a time domain.

In an example embodiment, in a case where the predefined hopping rule includes both of the inter-group hopping rule and the inter-period hopping rule, the inter-group hopping rule is used for establishing a mapping rule between resource positions of D2D resource groups that are adjacent in the time domain to each other in a D2D resource period, and the inter-period hopping rule is used for establishing a mapping rule between resource positions of D2D resource groups that are adjacent to each other in adjacent D2D resource periods; or, the inter-period hopping rule is used for establishing a mapping rule between resource positions of the first resource groups in adjacent D2D resource periods, wherein the adjacent D2D resource periods refer to D2D resource periods which are adjacent to each other in the time domain or D2D resource periods which are adjacent to each other in the time domain and in which the D2D signal is sent.

In an example embodiment, the inter-group hopping rule is the same as the inter-period hopping rule.

In an example embodiment, the mapping relationship between the D2D resource units established according to at least one of the inter-group hopping rule and the inter-period hopping rule is one of the following mapping relationships:

$k2=\text{mod}(\text{floor}((n1*K+k1+A+C)/N), K), n2=\text{mod}(n1*K+k1+A+D, N);$ $k2=\text{mod}(k1*N+n1+B+C, K), n2=\text{mod}(\text{floor}((k1*N+n1+B+D)/K), N);$ $k2=\text{mod}(k1+M+E, K), n2=\text{mod}(n1+k1+L+F, N);$ $k2=K-k1-1$ or $k2=\text{mod}(K-k1-1+E, K), n2=\text{mod}(n1+k1+L+F, N);$ wherein frequency hopping is executed according to a type2 Physical Uplink Shared Channel (PUSCH) hopping way defined by a Long Term Evolution (LTE), and a way of time domain hopping is as follows: n2=mod(n1+k1+L+F, N); and unhopped frequency positions are interleaved using an interleaver and a frequency position of a D2D resource after hopping unit is obtained according to a result of interleaving, and a way of time domain hopping is as follows: n2=mod(n1+k1+L+F,N), wherein floor(a) represents a rounddown of a; mod(a,b) represents a modulo operation between a and b; n1 and k1 are respectively corresponding to a time position and a frequency position of a D2D resource before hopping; n2 and k2 are respectively corresponding to a time position and a frequency position of a D2D resource after hopping; N represents a number of D2D resources that are included in a D2D resource group or a D2D resource period in a direction of time; K represents a number of D2D resources that are included in a D2D resource group or a D2D resource period in a direction of frequency; A, B, C, D, E, F, M and L are all integers; and a position of the D2D resource is a physical resource position or a virtual resource position.

In an example embodiment, the number of the D2D resource groups in a D2D resource period is one of the following numbers: a preset number; a number indicated by a D2D configuration signaling sent by a network-side device; and a number determined according to times a D2D signal is sent repeatedly in a D2D resource period.

In an example embodiment, the D2D signal includes one of the following signals: a signal for transmitting a D2D discovery message; a signal for transmitting a D2D communication control signaling; a signal for transmitting D2D communication data; and a signal for transmitting D2D synchronization.

In an example embodiment, the first determination component is arranged to determine the position of the first resource in one of the following ways of: receiving, from a network-side device, a control signaling for indicating the position of the first resource; randomly selecting the position of the first resource from a D2D resource set in a D2D resource period, wherein the D2D resource set is a part of or all of the D2D resource groups in the D2D resource period; receiving a control signaling sent from a network-side device and determining the position of the first resource according to the control signaling and the predefined hopping rule; determining the position of the first resource according to identification information of a User Equipment (UE); and indicating the position of the first resource using a D2D control signaling sent by another UE.

In an example embodiment, the first determination component is arranged to receive a specific radio resource control signaling from the network-side device and determine the position of the first resource according to the specific radio resource control signaling, wherein the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

In an example embodiment, the first determination component is arranged to receive a specific radio resource control signaling from a network-side device and determine the position of the first resource according to the specific radio resource control signaling, wherein the specific radio resource control signaling carries parameters for indicating a position of a specific D2D resource unit, the position of the specific D2D resource element is a position of the specific D2D resource unit in a first D2D resource period, and the first D2D resource period is indicated by configuration information, or the first D2D resource period is a D2D resource period for first sending the D2D signal; and the first determination component is further arranged to determine the position of the first resource according to the position of the specific D2D resource unit in the first D2D resource period and the predefined hopping rule.

In another embodiment of the disclosure, a device for controlling device-to-device communication is provided.

According to an embodiment of the disclosure, the device for controlling device-to-device communication includes: a configuration component arranged to configure a periodic Device-to-Device (D2D) communication resource; and a sending component arranged to send a configuration signaling according to the periodic D2D communication resource, wherein at least one of there is a mapping relationship between D2D resources in adjacent D2D resource periods, and the mapping relationship is determined based on an inter-period hopping rule; and there is a mapping relationship between D2D resources included in a D2D resource group in a D2D resource period, and the mapping relationship is determined based on an inter-group hopping rule; wherein at least one of the inter-period hopping rule and the inter-group hopping rule is used by a User Equipment (UE) to determine a position of a second resource according to a position of a first resource, wherein the first resource and the second resource are used by the UE to send a D2D signal, or the second resource is used by the UE to send a D2D signal.

In an example embodiment, at least one of the inter-group hopping rule and the inter-period hopping rule is as follows: according to at least one of a time domain position index and a frequency domain position index of a D2D resource before hopping, at least one of a time domain position index and a frequency domain position index of a D2D resource after hopping is calculated, wherein a principle corresponding to at least one of the inter-group hopping rule and the inter-period hopping rule includes at least one of the following principles of: executing a scattering processing for D2D resources having the same time domain position index through a hopping processing; and executing a frequency hopping processing for a frequency domain position of a D2D resource through a hopping processing.

In an example embodiment, the inter-group hopping rule is the same as the inter-period hopping rule.

In an example embodiment, a mapping relationship between the D2D resource units established according to at least one of the inter-group hopping rule and the inter-period hopping rule is one of the following mapping relationships:

$k2=\mathrm{mod}(\mathrm{floor}((n1*K+k1+A+C)/N),K), n2=\mathrm{mod}(n1*K+k1+A+D,N);$ $k2=\mathrm{mod}(k1*N+n1+B+C,K), n2=\mathrm{mod}(\mathrm{floor}((k1*N+n1+B+D)/K),N);$ $k2=\mathrm{mod}(k1+M+E,K), n2=\mathrm{mod}(n1+k1+L+F,N);$ $k2=K-k1-1$ or $k2=\mathrm{mod}(K-k1-1+E,K), n2=\mathrm{mod}(n1+k1+L+F,N);$ wherein frequency hopping is executed according to a type2 Physical Uplink Shared Channel (PUSCH) hopping way defined by a Long Term Evolution (LTE), and a way of time domain hopping is as follows: n2=mod(n1+k1+L+F, N); and unhopped frequency positions are interleaved using an interleaver and a frequency position of a D2D resource after hopping unit is obtained according to a result of interleaving, and a way of time domain hopping is as follows: n2=mod(n1+k1+L+F,N), wherein floor(a) represents a rounddown of a; mod(a,b) represents a modulo operation between a and b; n1 and k1 are respectively corresponding to a time position and a frequency position of a D2D resource before hopping; n2 and k2 are respectively corresponding to a time position and a frequency position of a D2D resource after hopping; N represents a number of D2D resources that are included in a D2D resource group or a D2D resource period in a direction of time; K represents a number of D2D resources that are included in a D2D resource group or a D2D resource period in a direction of frequency; A, B, C, D, E, F, M and L are all integers; and a position of the D2D resource is a physical resource position or a virtual resource position.

In an example embodiment, the number of the D2D resource groups in a D2D resource period is one of the following numbers: a preset number; a number indicated by a D2D configuration signaling sent by the sending component; and a number determined according to the times a D2D signal is sent repeatedly in a D2D resource period.

In an example embodiment, the D2D signal includes one of the following signals: a signal for transmitting a D2D discovery message; a signal for transmitting a D2D communication control signaling; a signal for transmitting D2D communication data; and a signal for transmitting D2D synchronization.

In an example embodiment, the sending component is arranged to send a control signaling for indicating the position of the first resource; alternatively, the sending component is arranged to send a control signaling, wherein the control signaling is used together with at least one of the inter-period hopping rule and the inter-group hopping rule for a UE to determine the position of the first resource.

In an example embodiment, the sending component is arranged to send a specific radio resource control signaling for indicating the position of the first resource, wherein the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

By determining the position of the first resource included in the D2D resources in the D2D resource period; determining the position of the second resource according to the position of the first resource and the predefined hopping rule, wherein the predefined hopping rule includes at least one of the following rules: the inter-group hopping rule for establishing a D2D resource between D2D resource groups in the D2D resource period, and the inter-period hopping rule for establishing the D2D resource between adjacent D2D resource periods, wherein the D2D resource group is obtained by dividing the D2D resources in each D2D resource period through at least one of the ways: time division multiplexing and frequency division multiplexing, and sending the D2D signal on physical resources corresponding to the first resource and the second resource or on the physical resource corresponding to the second resource, embodiments of the disclosure solve the problem that the application of D2D is limited because UEs which send the discovery signal synchronously cannot discover each other due to the half-duplex characteristic of D2D communication and consequentially avoid the occurrence of a situation that UEs which send and monitor the discovery signal synchronously cannot discover each other and therefore improve the universality of a method for device discovery.

BRIEF DESCRIPTION OF THE DRAWINGS

The accompanying drawings described herein which are incorporated into and form a part of the application are provided for the better understanding of the disclosure, and exemplary embodiments of the disclosure and the description of the exemplary embodiments serve to illustrate the present but are not to be construed as improper limitations to the disclosure. In the accompanying drawings.

DETAILED DESCRIPTION

The disclosure will be described below in detail with reference to accompanying drawings when read in conjunction with specific embodiments. It needs to be noted that the embodiments of the disclosure and the features thereof can be combined with each other when no conflict is caused.

At present, common cellular radio communication systems may be based on a Code Division Multiplexing Access (CDMA) technology, a Frequency Division Multiplexing Access (FDMA) technology, an Orthogonal-FDMA (OFDMA) technology and a Single Carrier-FDMA (SC-FDMA) technology. For example, a downlink (or called a forward link) and a uplink (or called a reverse link) of a 3rd Generation Partnership Project (3GPP) Long Term Evolution (LTE)/LTE-Advanced (LTE-A) cellular communication system are respectively based on an OFDMA technology and an SC-FDMA technology respectively. But in future, a link may be supportive to hybrid multiple access technologies.

Figure 1:
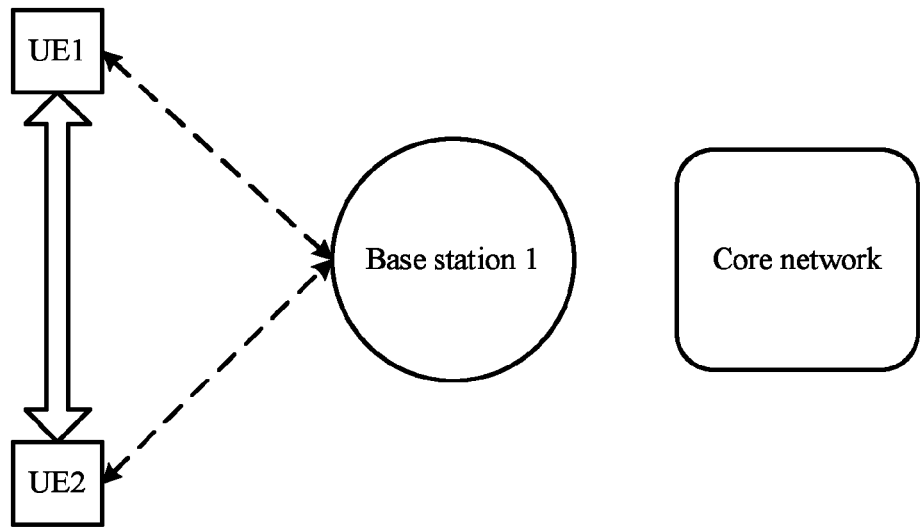
FIG. 1 is a schematic diagram illustrating D2D communication between two UEs.
Figure 2:
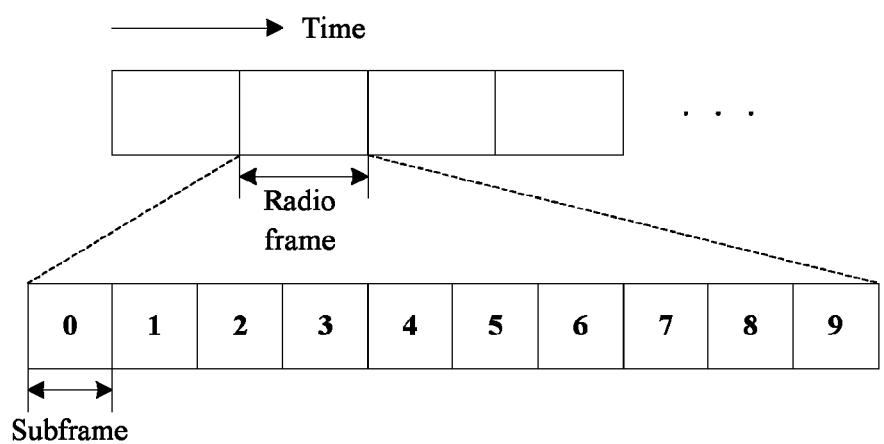
FIG. 2 is a schematic diagram illustrating a structure of a radio resource.

In an OFDMA/SC-FDMA system, a Radio Resource for communication is in a form of two dimensions of time and frequency. For example, for an LTE/LTE-A system, communication resources of the uplink and the downlink are divided into radio frames in a direction of time. FIG. 2 is a schematic diagram illustrating a structure of a radio resource. As shown in FIG. 2, a length of each radio frame is 10 ms, each radio frame may include 10 sub-frames with a length of 1 ms, and each sub-frame may include two slots whose length is 0.5 ms. On the other hand, according to a difference of configured Cyclic Prefixes (CP), each slot may include 6 or 7 OFDM symbols or SC-FDM symbols.

In a direction of frequency, a resource is divided into subcarriers; in practical communications, the smallest unit for a assignment of a frequency-domain resource is a Resource Block (RB), each RB corresponding to a Physical RB (PRB) of a physical resource. The PRB may include 12 subcarriers in the frequency domain, corresponding to a slot in the time domain. The resource of a subcarrier corresponding to an OFDM-SC-FDM is called a Resource Element (RE).

In LTE/LTE-A cellular communications, a UE discovers an LTE network by detecting a Synchronization Signal (SS). The SS includes a Primary Synchronization Signal (PSS) and a Secondary Synchronization Signal (SSS). By detecting the SS, the UE can be synchronized with a base station in downlink frequency and time. Moreover, because a physical cell identifier is carried in the SS, the discovery of the SS also means the discovery of an LTE/LTE-A cell by a UE.

On the uplink, when desiring to transmit uplink data, the UE needs to initiate a Random Access (RA) to realize uplink synchronization and establish a Radio Resource Control (RRC) connection. That is, the UE enters an RRC connected state from an RRC idle state. In the case of an RA, the UE needs to send an RA preamble, and a network side detects the RA preamble in specific time and frequency resources, thereby identifying the UE and realizing uplink synchronization.

In D2D communication, there is also a similar problem in the mutual discovery of communication devices, that is, to carry out a D2D communication, UEs needs to discover each other first, a mutual discovery of UEs for D2D communication is hereinafter referred to as the discovery of D2D communication, D2D discovery or device discovery. D2D discovery can be achieved through the transmission and detection of a Discovery Signal. The discovery signal may be in a form of a sequence, for example, in a form of the synchronization signal, the RA preamble and the reference signal used in a cellular network, or in a form of another sequence having a similar structure, for example, in a form of a Zadoff-Chu(ZC) sequence and Walsh codes. Apparently, a discovery signal may also be a packet or message which is modulated and coded in a specific way, for example, a Protocol Data Unit (PDU) on a Medium Access Control (MAC) layer. In addition, a discovery signal may also be in the form of the combination of a sequence and a packet or a message. On a physical layer, a discovery signal may be sent in a format of a Physical Uplink Shared Channel (PUSCH) of LTE.

Figure 3:
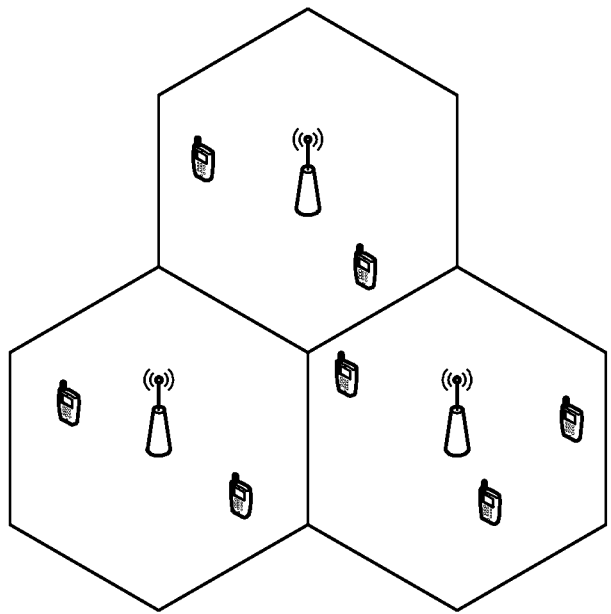
FIG. 3 is a schematic diagram illustrating a network deployment of a cellular radio communication system.

FIG. 3 is a schematic diagram illustrating a network deployment of a cellular radio communication system. As shown in FIG. 3, a cellular radio communication system may be a 3GPP LTE/LTE-A system or a system realized using another cellular radio communication technology. In an access network of a cellular radio communication system, network devices generally include a certain number of Base Stations (or called Node B) or evolved Nodes B (eNB) or enhanced Nodes B (eNB) and other network entities or network elements. Alternatively, generally, in 3GPP, access networks may be collectively referred to as a network-side Evolved Universal Terrestrial Radio Access Network (E-UTRAN). The base station mentioned here may further include a Low Power Node (LPN), for example, a femto cell or a home base station (pico, Relay, femto, HeNB (that is, Home eNB), that is located in a network. For the sake of convenience of description, three base stations are shown in FIG. 3. A base station provides a certain radio signal coverage area in which terminals (or called UEs or devices) can communicate with the base stations wirelessly. According to a specific rule, a radio signal coverage area of a base station may be divided into one or more cells or sectors, for example, three cells.

At present, the D2D discovery discussed in the 3GPP is applied to two scenarios: an in-network scenario and an out-of-network scenario. The 'in-network' refers to a location of the UEs performing D2D discovery in a coverage area of a cellular network, for example, the scenario shown in FIG. 3; the 'out-of-network' refers to a location of the UEs performing D2D detection outside of the coverage area of a cellular network, for example, the location of the UEs in a Coverage hole unachievable to a network or the location of the UEs in a Coverage hole resulting from a damage of a network device.

Figure 4:
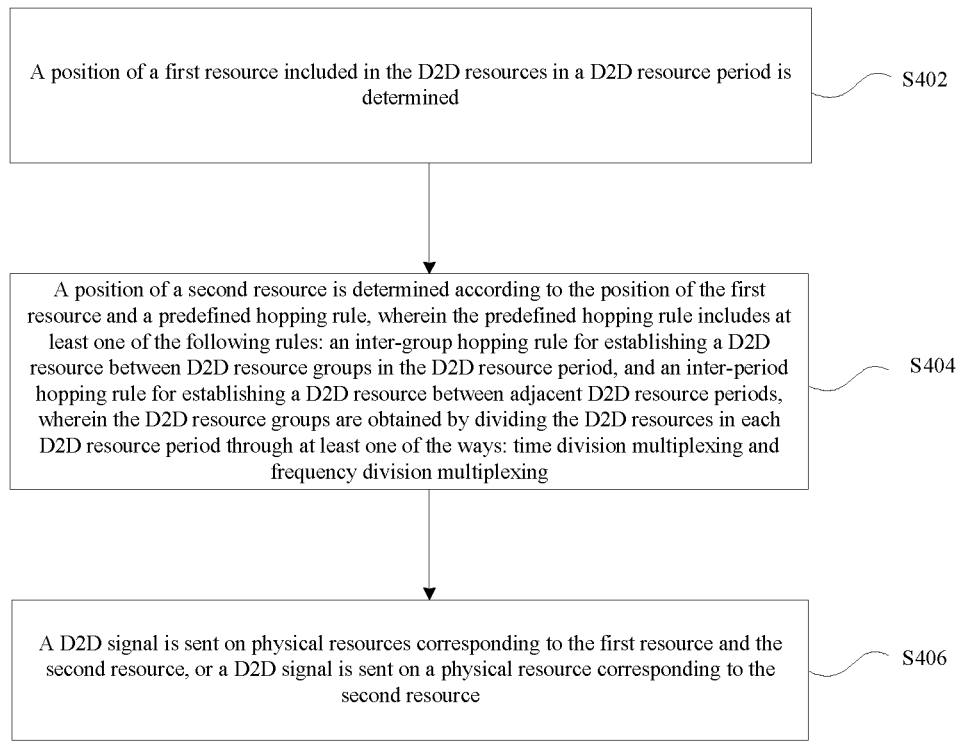
FIG. 4 is a flowchart illustrating a method for device-to-device communication according to an embodiment of the disclosure.

FIG. 4 is a flowchart illustrating a method for device-to-device communication according to an embodiment of the disclosure. As shown in FIG. 4, the method for device-to-device communication may include the following Steps:

Step 402: a position of a first resource included in the D2D resources in a D2D resource period is determined.

Step 404: a position of a second resource is determined according to the position of the first resource and a predefined hopping rule, in which the predefined hopping rule includes at least one of the following rules: an inter-group hopping rule for establishing a D2D resource between D2D resource groups in the D2D resource period, and an inter-period hopping rule for establishing a D2D resource between adjacent D2D resource periods, in which the D2D resource groups are obtained by dividing the D2D resources in each D2D resource period through at least one of the ways: time division multiplexing and frequency division multiplexing.

Step 406: a D2D signal is sent on physical resources corresponding to the first resource and the second resource, or a D2D signal is sent on a physical resource corresponding to the second resource.

Because of the half-duplex characteristic of D2D communication which disenables UEs synchronously sending the discovery signal to be discovered by each other, D2D communication is limited in application. For example, during a D2D discovery process, the UEs sending a D2D discovery signal synchronously cannot discover each other (for example, synchronous sending may refer to sending in the same subframe); during a D2D data communication process, the UEs which send a D2D control signaling (or called a Scheduling Assignment (SA)) or a D2D data signal synchronously cannot receive the D2D control signaling or D2D data signal sent by the opposite UE; and during a D2D synchronization process, the UEs which send D2D synchronization related information (which is, for example, born on a Physical D2D Synchronization Channel (PD2DSCH)) synchronously cannot receive the D2D synchronization information sent by the opposite UE. In the adoption of the method shown in FIG. 4, first, the position of the first resource included in the D2D resources in the D2D resource period is determined; then, the position of the second resource is determined according to the position of the first resource and the predefined hopping rule, and last, the D2D signal is sent on physical resources corresponding to the first and the second resource at the determined positions, or the D2D signal is sent on the physical resource corresponding to the second resource. For example, the first resources used by different UEs to send D2D signals may have the same time position, for example, the first resources may be in the same sub-frame. In this case, the D2D signal sent by the UE cannot be received by the opposite UE, however, the second resources used by the UEs to send the D2D signals can be determined based on the first resource and the predefined hopping rule through which the resources having the same time position are scattered. That is, after the hopping processing, the second resources used by different UEs to send D2D signals may be at different time positions (for example, in different sub-frames). Thus, the problem that because of the half-duplex characteristic of D2D communication which disenables UEs synchronously sending the discovery signal to be discovered by each other, D2D communication is limited in application is solved.

In an example embodiment, in a case where the predefined hopping rule includes the inter-group hopping rule, the first resource and the second resource are in the same D2D resource period, the inter-group hopping rule is used for establishing a mapping relationship between resource positions of different D2D resource groups in the D2D resource period; when the D2D signal is to be sent in a plurality of D2D resource periods, at least one of the position of the first resource for sending the D2D signal in each of the plurality of D2D resource periods are the same, and the position of the second resource for sending the D2D signal in each of the plurality of D2D resource periods are the same; or at least one of the position of the first resource and the position of the second resource is determined in each of the plurality of D2D resource periods.

In an example embodiment, in a case where the predefined hopping rule includes the inter-period hopping rule, the first resource and the second resource are in different periods, and the inter-period hopping rule is used for establishing a mapping relationship between D2D resource positions in adjacent D2D resource periods, in which a D2D resource position is a physical resource position or a virtual resource position, in a case where the D2D resource position is a virtual resource position, at least one of the followings is executed: a physical resource position corresponding to the first resource is determined according to the position of the first resource and a predefined D2D resource mapping rule; and a physical resource position corresponding to the second resource is determined according to the position of the second resource and the predefined D2D resource mapping rule, and the adjacent D2D resource periods refer to D2D resource periods which are adjacent to each other in a time domain or D2D resource periods which are adjacent to each other in a time domain and in which the D2D signal is sent In an example embodiment, the predefined D2D resource mapping rule is used for determining a physical resource position according to a virtual resource position, and the predefined D2D resource mapping rule is one of the following rules:

$$np(i)=i*\text{floor}(Np/Npg)+nv, kp(i)=kv;n \quad (1)$$

$$p(i)=i*\text{floor}(Np/Npg)+nv, kp(i)=\text{mod}(i,2)*(Kp-kv-1)+\text{mod}(i+1,2)*kv; \quad (2)$$

$$np(i)=i*\text{floor}(Np/Npg)+nv, kp(i)=\text{mod}(\text{mod}(i,2)*\text{floor}(Kp/2)+kv, Kp); \text{ and} \quad (3)$$

$$np(i)=i*\text{floor}(Np/Npg)+nv, kp(i)=\text{mod}(i*\text{floor}(Kp/\text{NUM})+kv, Kp), \quad (4)$$

in which NUM is a number of physical resources which send D2D signals from the same D2D sending source in a resource period; i is an index of a physical resource, and i=0, 1, 2, NUM−1; kp(i) and np(i) respectively represent a frequency domain position and a time domain position of a physical resource whose index is i; kv and nv respectively represent a frequency domain position and a time domain position of a virtual resource; Kp and Np respectively represent a number of frequency domain resources and a number of time domain resources of a physical resource for D2D communication in a resource period; and Npg represents a number of physical resources of a D2D resource group in a time domain.

In an example embodiment, in a case where the predefined hopping rule includes both of the inter-group hopping rule and the inter-period hopping rule, the inter-group hopping rule is used for establishing a mapping rule between resource positions of D2D resource groups that are adjacent in the time domain to each other in a D2D resource period, and the inter-period hopping rule is used for establishing a mapping rule between resource positions of D2D resource groups that are adjacent to each other in adjacent D2D resource periods; or, the inter-period hopping rule is used for establishing a mapping rule between resource positions of the first D2D resource groups in adjacent D2D resource periods, moreover the adjacent D2D resource periods refer to D2D resource periods which are adjacent to each other in the time domain or D2D resource periods which are adjacent to each other in the time domain and in which the D2D signal is sent.

In an example implementation process, the inter-group hopping rule is the same as the inter-period hopping rule.

In an example embodiment, at least one of the inter-group hopping rule and the inter-period hopping rule is as follows: according to at least one of a time domain position index and a frequency domain position index of a D2D resource before hopping, at least one of the time domain position index and the frequency domain position index of a D2D resource after hopping is calculated, moreover a principle corresponding to at least one of the inter-group hopping rule and the inter-period hopping rule includes at least one of the following principles of:

(1) a scattering process for D2D resources having the same time domain position index through a hopping processing is executed; and (2) a frequency hopping processing for the frequency domain position of a D2D resource through a hopping processing is executed.

In an example embodiment, the mapping relationship between the D2D resource units established according to at least one of the inter-group hopping rule and the inter-period hopping rule may be, but is not limited to be, one of the following mapping relationships:

$$k2=\mod(\text{floor}((n1*K+k1+A+C)/N),K), n2=\mod(n1*K+k1+A+D,N); \quad (1)$$

$$k2=\mod(k1*N+n1+B+C,K), n2=\mod(\text{floor}((k1*N+n1+B+D)/K),N); \quad (2)$$

$$k2=\mod(k1+M+E,K), n2=\mod(n1+k1+L,N); \quad (3)$$

$$k2=K-k1-1 \text{ or } k2=\mod(K-k1-1+E,K), n2=\mod(n1+k1+L+F,N); \quad (4)$$

frequency hopping is executed according to a type2 PUSCH hopping way defined by a Long Term Evolution (LTE), and a way of time domain hopping is as follows:

$$n2=\mod(n1+k1+L+F,N); \text{ and} \quad (5)$$

unhopped frequency positions are interleaved using an interleaver and a frequency position of a D2D resource after hopping unit is obtained according to a result of interleaving, and a way of time domain hopping is as follows:

$$n2=\mod(n1+k1+L+F,N), \quad (6)$$

in which floor(a) represents a rounddown of a; mod(a,b) represents a modulo operation for a dividend of a and a divisor of b; n1 and k1 are respectively corresponding to a time position and a frequency position of a D2D resource before hopping; n2 and k2 are respectively corresponding to a time position and a frequency position of a D2D resource after hopping; N represents a number of D2D resources that are included in a D2D resource group or a D2D resource period in a direction of time; K represents a number of the D2D resources that are included in a D2D resource group or a D2D resource period in a direction of frequency; A, B, C, D, E, F, M and L are all integers; and a position of the D2D resource is a physical resource position or a virtual resource position.

In an example embodiment, a number of the D2D resource groups in a D2D resource period may be, but is not limited to be, one of the following numbers:

(1) a preset number;

(2) a number indicated by a D2D configuration signaling sent by a network-side device; and (3) a number determined according to times a D2D signal is sent repeatedly in a D2D resource period.

In an example embodiment, the D2D signal may include, but is not limited to be, one of the following signals:

(1) a signal for transmitting a D2D discovery message;

(2) a signal for transmitting a D2D communication control signaling;

(3) a signal for transmitting D2D communication data; and (4) a signal for transmitting D2D synchronization.

In an example embodiment, in Step 402, a way of determining the position of the first resource is one of the followings:

Way 1: receiving, from a network-side device, a control signaling for indicating the position of the first resource;

Way 2: randomly selecting the position of the first resource from a D2D resource set in a D2D resource period, moreover the D2D resource set is a part of or all of the D2D resource groups in the D2D resource period;

Way 3: receiving a control signaling sent from a network-side device and determining the position of the first resource according to the control signaling and the predefined hopping rule;

Way 4: determining the position of the first resource according to identification information of a UE; and Way 5: indicating the position of the first resource using a D2D control signaling sent by another UE.

In an example embodiment, in the way 1: receiving, from the network-side device, the control signaling for indicating the position of the first resource may include:

a specific radio resource control signaling is received from the network-side device and the position of the first resource is determined according to the specific radio resource control signaling, moreover the specific radio resource control signaling carries parameters for indicating the position of the first resource, the parameters respectively indicate a time domain position and a frequency domain position of the first resource, or the parameters each simultaneously indicate a time-time domain position and a frequency domain position of the first resource.

In an example embodiment, in the Way 3: receiving the control signaling sent from the network-side device and determining the position of the first resource according to the control signaling and the predefined hopping rule may include:

a specific radio resource control signaling is received from the network-side device and the position of the first resource is determined according to the specific radio resource control signaling, moreover the specific radio resource control signaling carries parameters for indicating the position of a specific D2D resource unit, the position of the specific D2D resource unit is a position of a specific D2D resource unit in a first D2D resource period, and the first D2D resource period is indicated by configuration information, or the first D2D resource period is a D2D resource period for first sending the D2D signal; and the position of the first resource is determined according to the position of the specific D2D resource unit in the first D2D resource period and the predefined hopping rule.

The example implementation process will be described further below with reference to example implementation modes of example embodiments 1 to 6.

Example Embodiment 1

As a example implementation mode of the disclosure, the example embodiment 1 is described below by taking D2D discovery as an example.

In the example embodiment, a radio resource for device discovery is periodic, and the device discovery radio resource in each discovery resource period is divided into discovery resource units through at least one of time division multiplexing and frequency division multiplexing. In a discovery resource period, an assigned device discovery radio resource is divided into N*K resource discovery units, and N is a positive integer representing a number of resource discovery units in a direction of time; K is a positive integer representing a number of resource discovery units in a direction of frequency, a position of each resource discovery unit is corresponding to coordinates (n, k), in which n is an integer equal to or greater than 0 but smaller than N, and k is an integer equal to or greater than 0 but smaller than K. For example, a time length of a resource discovery unit may be one sub-frame or a multiple of a sub-frame (e.g. one sub-frame or two sub-frames), and a frequency bandwidth of the resource discovery unit may be one, two or three resource blocks. A physical resource corresponding to the resource discovery unit mentioned here may also be referred to as a physical discovery resource unit.

Figure 5:
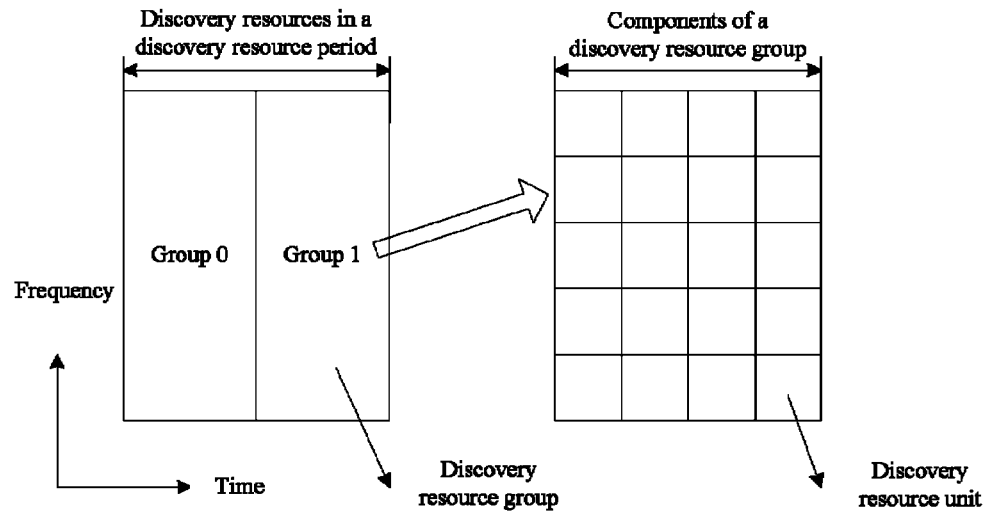
FIG. 5 is a schematic diagram illustrating a grouping of discovery resource units in a discovery resource period in a time domain according to a first example embodiment of the disclosure.

In a example implementation process, the discovery resource units in a discovery resource period may be grouped. FIG. 5 is a schematic diagram illustrating the grouping of the discovery resource units in a discovery resource period in the time domain according to a example embodiment 1 of the disclosure. The left part of FIG. 5 shows discovery resources in a discovery resource period. The discovery resources in a discovery resource period can be divided into two discovery resource groups each of which consists of discovery resource units.

It needs to be noted that the discovery resources in the discovery resource period may not be temporally successive.

The time length of each discovery resource unit is expressed as subframes, for example, each discovery resource unit occupies, in the time domain, one or two sub-frames, and the frequency bandwidth of each discovery resource unit is expressed as resource blocks, for example, the bandwidth of each discovery resource unit is two or three RBs.

Figure 6:
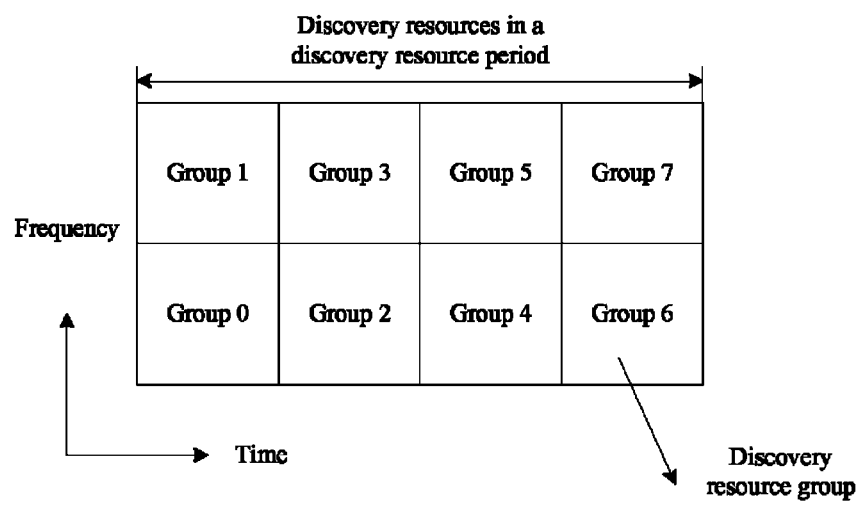
FIG. 6 is a schematic diagram illustrating a grouping of discovery resource units in a discovery resource period in both a time domain and a frequency domain according to a first example embodiment of the disclosure.

It needs to be noted that the foregoing numbers are merely example examples but not to be construed as improper limitations to the disclosure. Moreover, the grouping of discovery resources may refer to the grouping of the discovery resources in a discovery resource period merely in the time domain. Apparently, the grouping of discovery resources may also refer to the grouping of the discovery resources in a discovery resource period in both of the time domain and the frequency domain. FIG. 6 is a schematic diagram illustrating a grouping of discovery resource units in a discovery resource period in both a time domain and a frequency domain according to a first example embodiment of the disclosure. As shown in FIG. 6, the discovery resources in the discovery resource period are totally divided into eight groups, that is, groups 0 to 7, in the time domain and the frequency domain.

In an example implementation process, the discovery resources in the resource period are grouped by reference to the times a D2D discovery signal is sent repeatedly in the resource period. For example, an indicated repeated sending times is a number of the discovery resource groups in the resource period that are grouped in the time domain, the number of the discovery resource groups in the time domain is 2 in FIG. 5, and that of the discovery resource groups in the time domain is 4 in FIG. 6. In this case, it can be defined that discovery resources are only grouped in the time domain (e.g. as shown in FIG. 5), or the number of the discovery resource groups in the frequency domain may be specified (e.g. as shown in FIG. 6, there are two groups in the frequency domain).

How many times a discovery signal is sent repeatedly in a resource period is indicated by a network-side device (e.g. by sending a broadcast signaling or by carrying the times in a System Information Block (SIB)) or is set in advance.

In an example implementation process, a UE determines a position of a first discovery resource included in the discovery resources in the discovery resource period and then determines a position of a second discovery resource according to the position of the first discovery resource and a predefined hopping rule. A D2D discovery signal is sent on physical resources corresponding to the first discovery resource and the second discovery resource or on a physical resource corresponding to the second discovery resource, in which the predefined hopping rule includes at least one of the following rules: an inter-group hopping rule for establishing a discovery resource between discovery resource groups in a discovery resource period, and an inter-period hopping rule for establishing a discovery resource between adjacent discovery resource periods. The different contents included in the predefined hopping rules are described below in details.

(1) when the predefined hopping rule includes the inter-group hopping rule for establishing a discovery resource between discovery resource groups in a discovery resource period, the inter-group hopping rule is used for establishing a mapping relationship between resource positions of discovery resource groups that are adjacent in the time domain to each other in a discovery resource period. That is, the first discovery resource and the second discovery resource are located in the same period. When it is needed to send a discovery signal in a plurality of discovery resource periods, at least one of the position of the first discovery resource for sending the D2D signal in each of the plurality of D2D resource periods are the same, and the position of the second discovery resource for sending the D2D signal in each of the plurality of D2D resource periods are the same; or at least one of the position of the first discovery resource and the position of the second discovery resource is determined in each of the plurality of discovery resource periods, in which a sameness of the positions refers to that the resource positions where a UE sends the discovery signal in the plurality of periods have the same position index.

(2) when the predefined hopping rule includes the inter-period hopping rule for establishing a discovery resource between adjacent discovery resource periods, the first discovery resource and the second discovery resource are in different periods, and the inter-period hopping rule is used for establishing a mapping relationship between discovery resource positions in adjacent discovery resource periods. The discovery resource position refers to a physical resource position or a virtual resource position, and when the discovery resource position is a virtual resource position, a physical resource position corresponding to the position of the second discovery resource can be determined according to the position of the second discovery resource and a predefined discovery resource mapping rule. The discovery resource position being a physical resource position can be explained as an absence of a discovery resource group in a discovery resource period or a forming of a discovery resource group by the resource groups in a period.

(3) in a case where the predefined hopping rule includes both of the inter-group hopping rule for establishing a discovery resource between discovery resource groups in a discovery resource period and the inter-period hopping rule for establishing a discovery resource between adjacent discovery resource periods, the inter-group hopping rule is used for establishing a mapping rule between resource positions of different discovery resource groups in the discovery resource period, for example, between resource positions of discovery resource groups that are adjacent in the time domain to each other or between resource positions of discovery resource groups which are spaced from each other at a specific distance in the time domain; and the inter-period hopping rule is used for establishing a mapping rule between resource positions of discovery resource groups that are adjacent to each other in adjacent discovery resource periods, or the inter-period hopping rule is used to establish a mapping rule between resource positions of the first discovery resource groups in adjacent discovery resource periods. In an example embodiment, the inter-group hopping rule is the same as the inter-period hopping rule or the inter-group hopping rule is different from the inter-period hopping rule.

In an example implementation process, the hopping rule calculates, according to at least one of the time domain position index and the frequency domain position index of an unhopped discovery resource, at least one of the time domain position index and the frequency domain position index of a hopped discovery resource, in which the principle of the hopping rule includes, but is not limited to be, at least one of the following principles:

(1) a scattering processing discovery resources having the same time domain position index through a hopping processing is executed; and (2) a frequency hopping processing for the frequency domain position of a discovery resource through a hopping processing is executed.

It should be noted that the foregoing instance may also be applicable to the transmission of another D2D signal, for example, SA or D2D data or D2D synchronization.

Example Embodiment 2

As another example implementation of the disclosure, the embodiment is described below by taking D2D discovery as an example.

In the example embodiment, a hopping rule is preset for discovery resources of different discovery resource groups in a discovery resource period, in which the inter-group hoping rule is used for establishing a mapping relationship between resource positions of discovery resource groups that are adjacent in the time domain to each other in a discovery resource period.

Figure 7:
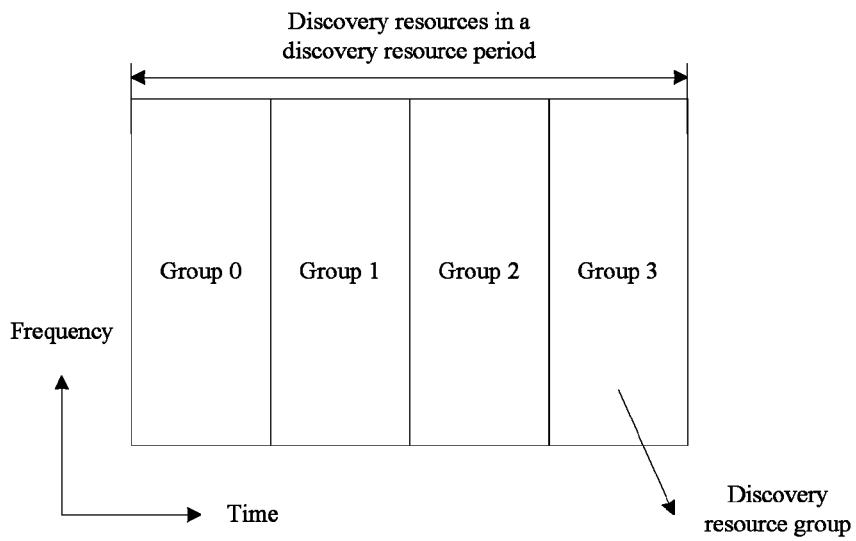
FIG. 7 is a schematic diagram illustrating a grouping of discovery resource units in a discovery resource period in a time domain according to a second example embodiment of the disclosure.

FIG. 7 is a schematic diagram illustrating a grouping of discovery resource units in a discovery resource period in the time domain according to a second example embodiment of the disclosure. As shown in FIG. 7, the discovery resource in each period is divided, in the time domain, into four discovery resource groups in each of which a plurality of discovery resource units are included. For the division of discovery resource groups, it can be limited that a same number of discovery resource units are included in each discovery resource group.

In an example implementation process, the inter-group hopping rule is used for establish a mapping relationship for discovery resource units in the discovery resource groups that are adjacent in the time domain to each other in a period. As shown in FIG. 7, each discovery resource unit in a discovery resource group 1 is corresponding to a discovery resource unit in a discovery resource group 0, each discovery resource unit in a discovery resource group 2 is corresponding to a certain discovery resource unit in the discovery resource group 1, and similarly, each discovery resource unit in a discovery resource group 3 is corresponding to a certain discovery resource unit in a the discovery resource group 2.

In an example implementation process, when desiring to send a discovery signal, a UE first determines a position of a first resource for sending a discovery signal. The first resource may be a discovery resource unit corresponding to the initial sending of a discovery signal in a period. As shown in FIG. 6, a UE may send a discovery signal once in each discovery resource group, in this case, the position of the first resource used by the UE to send the discovery signal is in the group 0, and a second resource for sending the discovery signal is in groups 1, 2 and 3. In other words, the UE determines the position of a resource for sending a discovery signal initially in a period first and then the positions of the rest resources for sending the discovery signal in the period based on the position and the predefined inter-group hopping rule, and then the UE sends the device discovery signal at positions of the resources.

Optionally, in a case where it is needed to send a discovery signal in a plurality of discovery resource periods, at least one of the first discovery resource sending the discovery signal has the same position in the plurality of periods, and the second discovery resource sending the discovery signal has the same position in the plurality of periods are the same. That is, the discovery signal is sent repeatedly at the same time and frequency positions in the plurality of periods. For example, a network side indicates the position of the first discovery resource for the UE through a specific signaling, and the UE determines the position of a second discovery resource according to the position of the first discovery resource and the predefined inter-group hopping rule.

Optionally, when it is needed to send a discovery signal in a plurality of discovery resource periods, at least one of the position of a first discovery resource and the position of a second discovery resource in each of the plurality of periods is determined. For example, the UE randomly selects a first discovery resource for sending a discovery signal in a first discovery resource group (group 0) in each sending period and then determines the position of a second discovery resource based on the position of the first discovery resource and the predefined inter-group hopping rule. Alternatively, the first discovery resource may not be limited to be in the first discovery resource group. For example, the UE randomly selects a first discovery resource for sending a discovery signal in a period and then determines the position of a second discovery resource based on the position of the first discovery resource and the predefined inter-group hopping rule. Assuming that the first discovery resource selected by the UE is in a discovery resource group 2, then the positions of a second discovery resource in the discovery resource groups 0, 1 and 3 can be determined based on the position of the first discovery resource and the predefined hopping rule.

Figure 8:
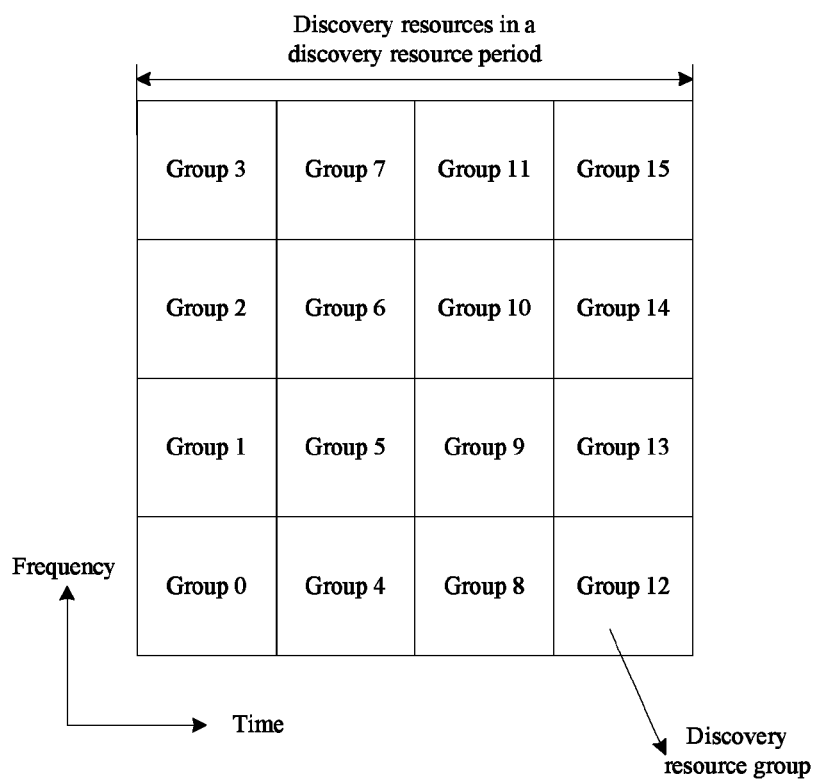
FIG. 8 is a schematic diagram illustrating a grouping of discovery resource units in a discovery resource period in both a time domain and a frequency domain according to a second example embodiment of the disclosure.

In an example implementation process, the discovery resources in the period may be grouped in the time domain in combination with the frequency domain. In this case, the inter-group hopping rule is used to establish a mapping relationship for discovery resource units in the discovery resource groups that are adjacent to each other in the time domain. For example, in the resource grouping mode shown in FIG. 6, a mapping relationship may be established between groups 0 and 2, groups 2 and 4 or groups 4 and 6, or a mapping relationship is established between groups 0 and 3, groups 3 and 4 or groups 4 and 7. The latter mapping can be comprehended as the hopping of discovery resources in the frequency domain by taking discovery resource group as the unit (or referred to as frequency hopping). A frequency hopping may be a mirrored frequency hopping or a hopping between two positions that are spaced from each other at the maximum distance in the frequency domain. FIG. 8 is a schematic diagram illustrating a grouping of the discovery resource units in a discovery resource period in both a time domain and a frequency domain according to a second example embodiment of the disclosure. As shown in FIG. 8, when a discovery signal is initially sent in a group 0 (that is, the first discovery resource is located in the group 0), then the second discovery resource is located in the groups 7, 8 and 15, that is, the mapping relationship between discovery resource elements in corresponding groups is established based on the inter-group hopping rule; when the first discovery resource is located in the group 1, then the second discovery resource is located in groups 6, 9 or 14, so on and so forth.

It should be noted that the foregoing instance may also be applicable to the transmission of another D2D signal, for example, SA or D2D data or D2D synchronization.

Example Embodiment 3

As another example implementation of the disclosure, the embodiment is described below by taking D2D discovery as an example.

In the example embodiment, a hopping rule is preset for discovery resources in different discovery resource periods, in which the inter-period hoping rule is used for establishing a mapping relationship between resource positions in adjacent discovery resource periods.

Figure 9:
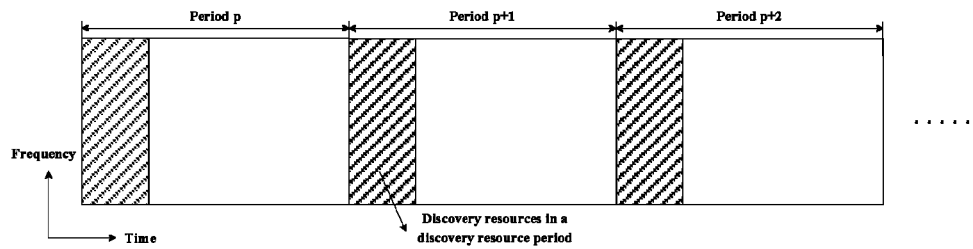
FIG. 9 is a schematic diagram illustrating an assignment of periodic resources according to an example embodiment of the disclosure.

FIG. 9 is a schematic diagram illustrating a assignment of periodic resources according to an example embodiment of the disclosure. As shown in FIG. 9, establishing a mapping relationship between resource positions in adjacent discovery resource periods means that each of the discovery resources in a period p is corresponding to a unique discovery resource in a period p+1 and that each of the discovery resources in the period p+1 is corresponding to a unique discovery resource in a period p+2.

It should be noted that in practical applications, discovery resources may not be successive in the time domain and discovery resources may only occupy a part of frequency band in the frequency domain.

In an example implementation process, when desiring to send a discovery signal, a UE first determines the position of a first discovery resource for sending the discovery signal. The first discovery resource may be located at the position of a discovery resource in a first resource period, in which the first resource period may be the first discovery resource period generated after a configuration signaling for configuring a discovery resource comes into effect or a discovery resource period that is explicitly indicated to be the starting discovery resource period. However, the period in which a UE sends a discovery signal for the first time may be after the first discovery resource period. In this case, the UE determines the position of a second discovery resource for sending the discovery signal based on the position of the first discovery resource and a predefined inter-period hopping rule. For example, the UE actually starts the sending of a discovery signal in the period 2 (the number of the first discovery resource period or the starting discovery resource period is 0). In this case, the UE first determines the position of a second discovery resource in the period 2 through two times of hopping based on the position of the first discovery resource and then sends the discovery signal on the second discovery resource. When it is needed to send a discovery signal in a plurality of periods, the positions of the other second discovery resources in subsequent periods are subsequently determined based on the position of the discovery resource in the period 2 and the inter-period hopping rule.

Optionally, the first discovery resource is the resource which sends a discovery signal first after a UE start sending the discovery signal. For example, when the resource used by the UE to send a discovery signal for the first time is located in a discovery resource set in the period 1, the UE determines the position of a second discovery resource for sending the discovery signal subsequently based on the position of the first discovery resource and the inter-period hopping rule. For example, when the period in which a UE sends a discovery signal is the same as a discovery resource period, then the UE determines the positions of second discovery resources for sending the discovery signal in periods such as periods 2 and 3 according to the position of the first discovery resource and the inter-period hopping rule. Then the UE sends a discovery signal on the first discovery resource and the second discovery resources.

In a example implementation process, the position of the first discovery resource may be determined in one of the following ways:

(1) configured by a base station through a specific signaling;

(2) randomly selected by a UE from a discovery resource set in a period; and (3) determined by a UE based on a specific identifier.

In an example implementation process, the discovery resource in a period is a physical resource. That is, the position of a discovery resource is corresponding to a physical discovery resource unit, and a UE sends a discovery signal once in a sending period.

Figure 10:
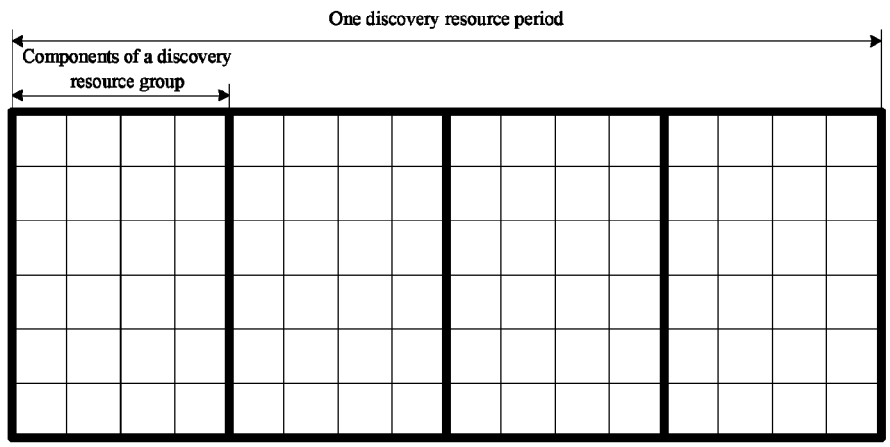
FIG. 10 is a schematic diagram illustrating components of a discovery resource group in a discovery resource period according to an example embodiment of the disclosure.

In an example implementation process, the discovery resource in the described period is a virtual resource. After determining the positions of a first and a second discovery resource for sending a discovery signal, a UE determines, according to a predefined discovery resource mapping rule, the position of a physical resource for sending the discovery signal. For example, the UE needs to send a discovery signal for n times (n>1) in a resource period for sending a discovery signal. Assuming that there are m physical discovery resource units in a resource period, the discovery resource in a period may include m/n virtual discovery resource units. FIG. 10 is a schematic diagram illustrating components of a discovery resource group in a discovery resource period according to an example embodiment of the disclosure. As shown in FIG. 10, based on an example of n being 4, assuming that 96 (that is, 16*6) physical discovery resource units are included in each discovery resource period, the discovery resource units in a period are divided into four groups in the time domain, and a UE sends a discovery signal once in each of the four discovery resource groups.

Figure 11:
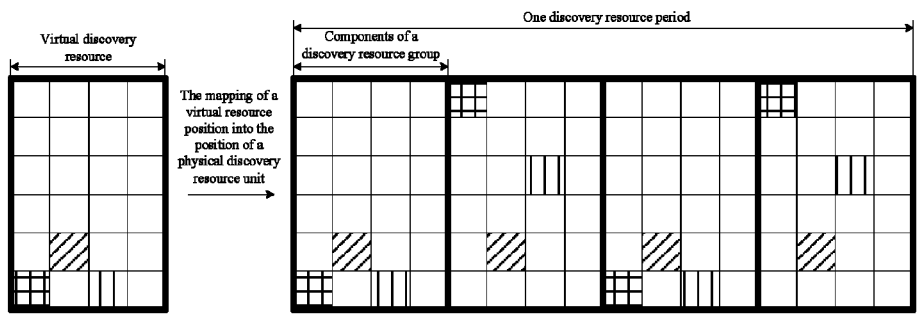
FIG. 11 is a schematic diagram illustrating a predefined discovery resource mapping rule according to an example embodiment of the disclosure.

FIG. 11 is a schematic diagram illustrating a predefined discovery resource mapping rule according to an example embodiment of the disclosure. As shown in FIG. 11, the predefined discovery resource mapping rule may be as follows: the time domain position of a virtual resource is corresponding to the time domain position of a physical discovery resource unit which is included in a discovery resource group to send a discovery signal, or the frequency domain position of a virtual resource is corresponding to the frequency domain position of a physical discovery resource unit which is included in a discovery resource group to send a discovery signal, as shown by the slashed shadow shown in FIG. 11. The mapping rule can be expressed with the following formulas: np(i)=i*floor(Np/Npg)+nv, and kp(i)=kv.

Alternatively, in the predefined discovery resource mapping rule, the resources in the time domain are mapped in the way described above, and the resources in the frequency domain are mapped in, for example, the way shown by the vertically lined shadow shown in FIG. 11, that is, the frequency hopping in the frequency domain is increased, the mapping rule may be expressed with the following formulas: np(i)=i*floor(Np/Npg)+nv, and kp(i)=mod(mod(i,2)*floor(Kp/2)+kv,Kp); or the resources in the frequency domain are mapped in, for example, the way shown by the latticed shadow shown in FIG. 11, that is, the frequency hopping in the frequency domain is mirrored frequency hopping which can be expressed with the following formulas: np(i)=i*floor(Np/Npg)+nv, and kp(i)=mod(i,2)*(Kp−kv−1)+mod(i+1,2)*kv.

In the foregoing implementation mode, it may be defined that a virtual resource is the physical resources included in the first discovery resource group in a D2D discovery resource period, that is, it is specified that the index of the resources in the first discovery resource group is corresponding to a virtual resource.

Alternatively, a mode similar to the hopping rule described in related instances may be included in the predefined discovery resource rule. For example, a virtual resource is corresponding to the position of the physical resource in the first discovery resource group in a resource group, and the positions of the discovery resources in the other discovery resource groups in the period are determined according to the position of the virtual resource and a hopping rule. A specific hopping rule will be described in the following example embodiments.

It should be noted that the specific numbers used in the foregoing embodiments are merely example examples but not to be construed as improper limitations to the disclosure.

It also should be noted that the foregoing instance may also be applicable to the transmission of another D2D signal, for example, SA or D2D data or D2D synchronization.

Example Embodiment 4

As still another example implementation mode of the disclosure, the embodiment is described below by taking D2D discovery as an example.

In the example embodiment, the predefined inter-group hopping rule is used for establishing a mapping rule between discovery resource units included in different discovery resource groups in a discovery resource period, and the predefined inter-period hopping rule is used to establish a mapping rule between positions of discovery resources in adjacent discovery resource periods.

Figure 12:
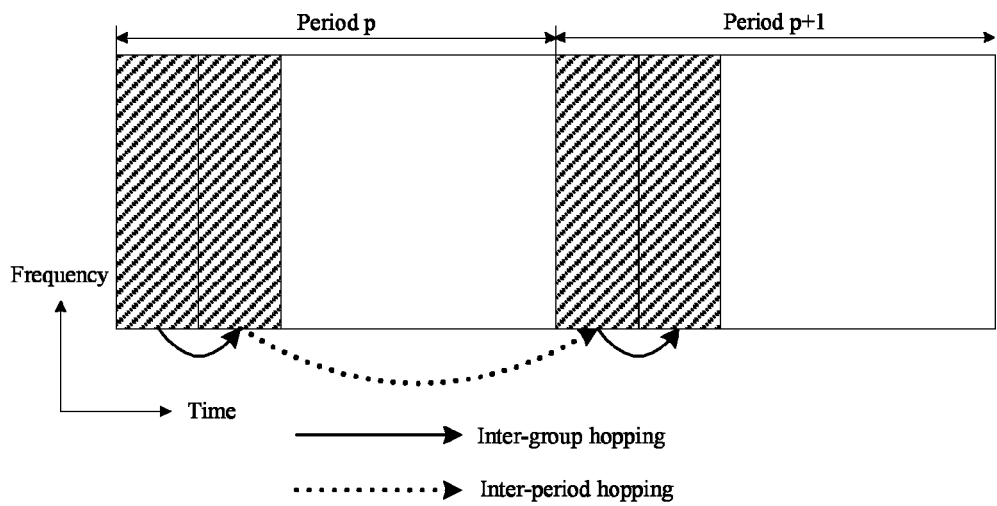
FIG. 12 is a schematic diagram illustrating an inter-group hopping and an inter-period hopping according to a first example embodiment of the disclosure.

In an example implementation process, the inter-group hopping rule is used to establish a mapping relationship between discovery resource units in adjacent discovery resource groups in a discovery resource period, and the inter-period hopping rule is used to establish a mapping relationship between discovery resource units in adjacent discovery resource groups in different discovery resource periods. FIG. 12 is a schematic diagram illustrating an inter-group hopping and an inter-period hopping according to a first example embodiment of the disclosure. As shown in FIG. 12, it is assumed herein that two discovery resource groups are included in each resource period in the time domain.

Figure 13:
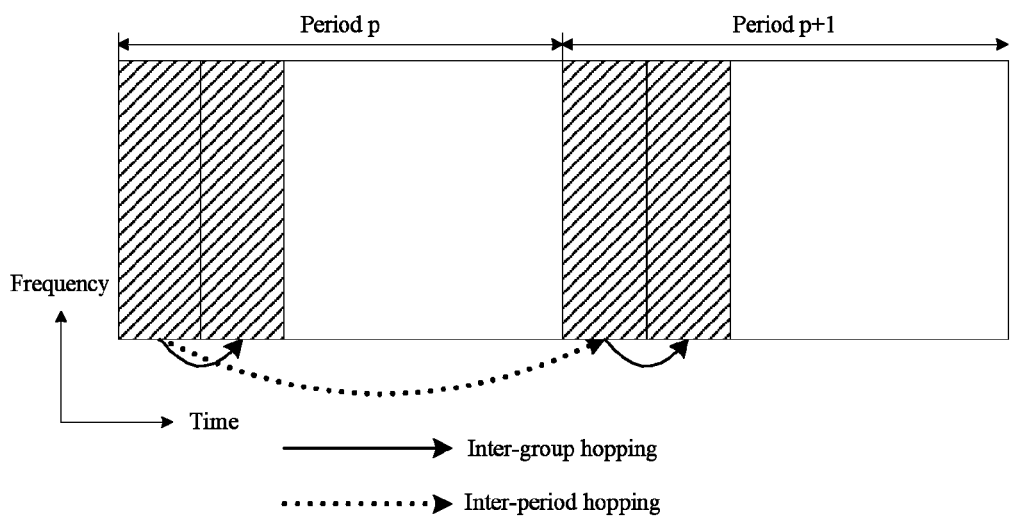
FIG. 13 is a schematic diagram illustrating an inter-group hopping and an inter-period hopping according to a second example embodiment of the disclosure.

In an example implementation process, the inter-group hopping rule is used to establish a mapping relationship between discovery resource units in adjacent discovery resource groups in a discovery resource period, and the inter-period hopping rule is used to establish a mapping relationship between discovery resource units in the first discovery resource groups in adjacent discovery resource periods. FIG. 13 is a schematic diagram illustrating an inter-group hopping and an inter-period hopping according to a second example embodiment of the disclosure. As shown in FIG. 13, it is assumed here that two discovery resource groups are included in each resource period in the time domain.

Optionally, the inter-group hopping rule is different from the inter-period hopping rule.

Optionally, the same hopping rule is used as inter-group hopping and inter-period hopping.

In an example implementation process, when desiring to send a discovery signal, a UE first determines the position of a first discovery resource for sending the discovery signal. The first discovery resource may be located at a discovery resource position in a first resource period, in which the first resource period may be the first discovery resource period generated after a configuration signaling for configuring a discovery resource comes into effect or a discovery resource period that is explicitly indicated to be the starting discovery resource period. Alternatively, more specifically, the first discovery resource is located in the first discovery resource group in the first resource period. The UE may determine, according to the inter-group hopping rule, the positions of the discovery resources for sending a discovery signal that are included in the other discovery resource groups in the first discovery resource period and determine, according to the inter-period hopping rule and the inter-group hopping rule, the positions of the discovery resources for sending the discovery signal that are included in subsequent discovery resource periods, in which the discovery resources for sending a discovery signal that are included in the other discovery resource groups in the first discovery resource period and the discovery resources for sending a discovery signal that are included in subsequent discovery resource periods are referred here as second discovery resources.

When the period in which a UE sends a discovery signal for the first time is after the first discovery resource period, then the UE determines the positions of the second discovery resources for sending the discovery signal according to the position of the first discovery resource in combination with the inter-period hopping rule or both of the inter-period hopping rule and the inter-group hopping rule. For example, the UE practically starts sending a discovery signal in the period 1 (the number of the first discovery resource period or the starting discovery resource period is 0). As shown in FIG. 12, the UE first determines the position of the second discovery resource in the period 1 based on the position of the first discovery resource in combination with the inter-group hopping rule and the inter-period hopping rule and then sends the discovery signal on the second discovery resource. When it is needed to send a discovery signal in a plurality of periods, the positions of the other second discovery resources in subsequent periods are subsequently determined in the same way based on the position of the discovery resource in the period 1 and a hopping rule. As shown in FIG. 13, the UE first determines the position of the second discovery resource included in the first discover resource group in the period 1 based on the position of the first discovery resource and the inter-period hopping rule and then determines the position of the second discovery resource included in the second discover resource group in the period 1 based on the position of the second discovery resource in the first discover resource group and the inter-group hopping rule and then sends the discovery signal on the second discovery resources. When it is needed to send a discovery signal in a plurality of periods, the positions of the discovery resources in subsequent discovery resource periods are obtained in a similar way which is not descried here repeatedly.

Example Embodiment 5

As still another example implementation mode of the disclosure, a hopping rule will be described below.

In the example embodiment, a hoping rule is used for establishing a mapping relationship between discovery resource elements. By means of the mapping relationship, the position coordinates (n2, k2) of a hopped discovery resource element whose position coordinates are (n1, k1) before the hopping can be obtained.

Optionally, the mapping relationship may be as follows:

$$k2=\mathrm{mod}(\mathrm{floor}((n1*K+k1+A+C)/N),K);\ \mathrm{and}$$

$$n2=\mathrm{mod}(n1*K+k1+A+D,N);$$

in which floor(a) represents the rounddown of a, for example, floor(2.6)=2; mod(a,b) represents a modulo operation for a dividend of a and a divisor of b, for example, mod(8,3)=2; and A, C and D are all integers, where C and D may have the same value or not;

For example, A may be a constant.

Alternatively, A is a cell-specific parameter, for example, a physical cell ID or a parameter configured by a network-side device, or A is a number calculated according to a physical cell identifier, for example, A=mod(PCID, K), or A=mod(PCID, N) or A=mod(PCID, N*K).

Alternatively, A is a parameter which is related to a discovery resource period and set to be an integer, for example, the value of A changes with periods, for example, the value of A is the number or index of a period directly, that is, the value of A is 0 in the first period configured by a base station configuration signaling, the value of A is 1 in the second period configured by the base station configuration signaling, so on and so forth.

Alternatively, A is determined based on N or K. For example, A=floor(N/2), or A=floor(K/2), or A is a prime number with respect to N, for example a prime number smaller than N but most close to N, or A is a prime number with respect to K, for example, a prime number smaller than K but most close to K.

Alternatively, A is the sum of the plurality of foregoing parameters.

Apparently, the value of A may be set to be 0. In other words, the parameter A may not be included in the formula expressing a mapping relationship.

The values of C and D are set in a way similar to the way the value of A is set.

For example, in a specific implementation mode, A is a cell-specific parameter whose value is, for example, a PCID or whose value is calculated based on a PCID, C is a parameter that is related to a D2D resource period and set to be an integer, for example, the value of C is the index of a D2D resource period, and the value of D is set in a way similar to the way the value of C is set. Alternatively, in an embodiment, A is a cell-specific parameter whose value is, for example, a PCID or whose value is calculated based on a PCID, and the values of C and D are 0, that is, C and D are absent in a mapping relationship. In other words, the foregoing settings of values can be combined optionally.

Figure 14:
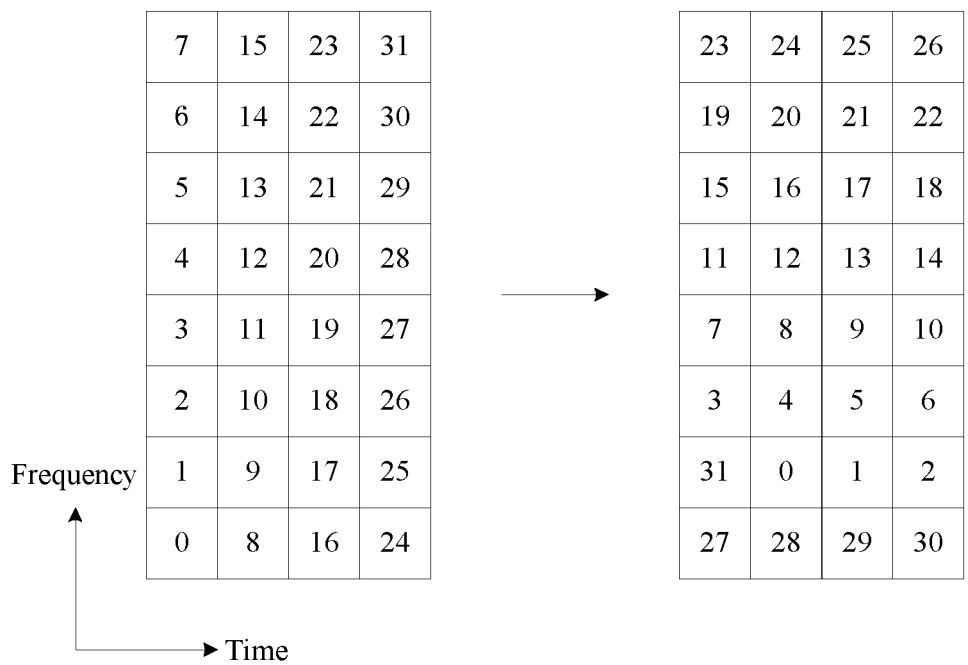
FIG. 14 is a schematic diagram illustrating position relationships of discovery resource units presented before and after a hopping according to a first example embodiment of the disclosure.

FIG. 14 is a schematic diagram illustrating position relationships of discovery resource units presented before and after a hopping according to a first example embodiment of the disclosure. As shown in FIG. 14, assuming that N is 4 and K is 8, that is, 32 discovery resource units are included in a discovery resource set and numbered in the way shown in the part of FIG. 14 on the left of the arrow shown in FIG. 14. Assuming that A=B=3, after the discovery resource units are hopped in the hopping way, the positions of the 32 discovery resource units are shown in the part of FIG. 14 on the right of the arrow shown in FIG. 14.

It should be noted that the specific numbers used in the foregoing embodiments are merely example examples but not to be construed as improper limitations to the disclosure.

Optionally, the mapping relationship may be as follows:

$$n2=\mathrm{mod}(\mathrm{floor}((k1*N+n1+B+C)/K),N),\ \mathrm{and}$$

$$k2=\mathrm{mod}(k1*N+n1+B+D,K);$$

In which B is an integer whose value may be determined in the way the value of the parameter A is set, and the other parameters included in the mapping relationship have the same meaning with corresponding parameters described above and are therefore not described here repeatedly.

Optionally, the mapping relationship may be as follows:

$$k2=\mathrm{mod}(k1+M+E,K),\ \mathrm{and}$$

$$n2=\mathrm{mod}(n1+k1+L+F,N),$$

in which M, L, E and F are all integers, in which M, L, E and F can be determined in a way similar to the way A or B is determined. Moreover, the values of E and F may be the same or not. For example, in an embodiment, M is determined based on N or K, for example, M is smaller than N and is a prime number with respect to N, E is a cell-specific parameter whose value is a PCID or calculated based on a PCID, and L and F are 0. Alternatively, in an embodiment, M is determined based on N or K, for example, M is smaller than N and is a prime number with respect to N, E and F are 0, L is a cell-specific parameter whose value is a PCID or calculated based on a PCID. In other words, the foregoing settings of values can be combined optionally.

Figure 15:
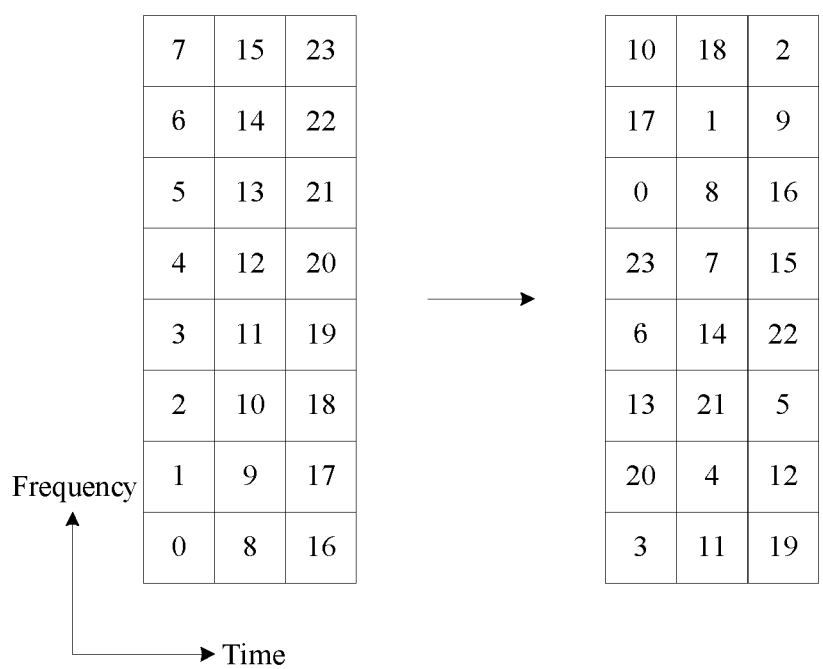
FIG. 15 is a schematic diagram illustrating position relationships of discovery resource units presented before and after a hopping according to a second example embodiment of the disclosure.

FIG. 15 is a schematic diagram illustrating position relationships of discovery resource units presented before and after a hopping according to a second example embodiment of the disclosure. As shown in FIG. 15, assuming here that N=3, K=8, M=3, L=0 and E=F=0.

Optionally, the mapping relationship may be as follows:

$$k2=K-k1-1\ \mathrm{or}\ k2=\mathrm{mod}(K-k1-1+E,K);\ \mathrm{and}$$

$$n2=\mathrm{mod}(n1+k1+L+F,N);$$

in which M, L, E and F are all integers that can be determined in a way similar to the way A or B is determined.

Figure 16:
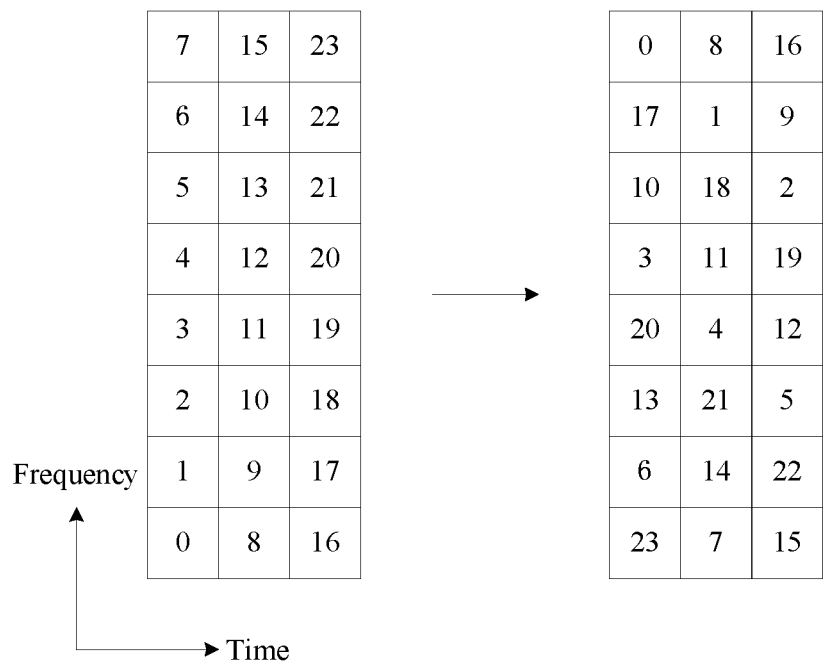
FIG. 16 is a schematic diagram illustrating position relationships of discovery resource units presented before and after a hopping according to a third example embodiment of the disclosure.

FIG. 16 is a schematic diagram illustrating position relationships of discovery resource units presented before and after a hopping according to a third example embodiment of the disclosure. As shown in FIG. 16, it is still assumed here that N=3, K=8, M=3, L=0 and F=0.

In a example implementation process, the same hopping rule is separately used to determine a mapping relationship in the time domain and a mapping relationship in the frequency domain, in which determining a mapping relationship in the time domain refers to interleaving frequency positions of discovery resource elements using an interleaver and then determining the frequency position of a hopped discovery resource element according to the result of the interleaving. For example, the interleaver, which may be an interleaver defined by an LTE system, may be designed by reference to the LTE protocol 36.212 and is therefore not described here repeatedly. The mapping relationship in the time domain is as follows: n2=mod(n1+k1+L+F,N), in which parameters have the same meaning with corresponding parameters described above.

Figure 17:
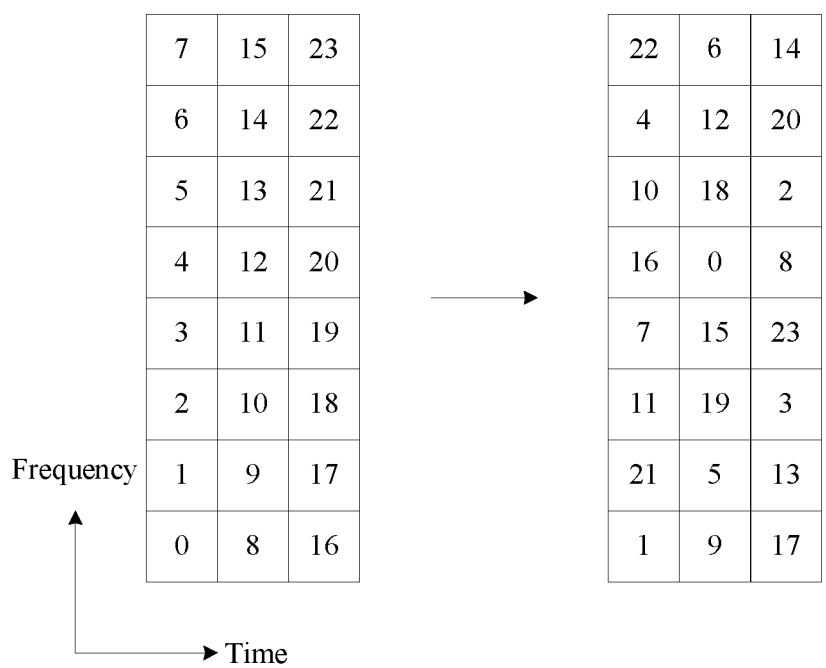
FIG. 17 is a schematic diagram illustrating position relationship among hopped resources according to an example embodiment of the disclosure.

For example, assuming again that N is 3 and K is 8, the frequency position index K1 of an unhopped discovery resource unit is as follows: K1=<0,1,2,3,4,5,6,7>, assuming that the interleaver used is an interleaver defined by an LTE protocol, the arrangement sequence of the frequency position index K2 after the interleaving is as follows: K2=<1, 5,3,7,0,4,2,6>. FIG. 17 is a schematic diagram illustrating a position relationship among hopped resources according to an example embodiment of the disclosure. As shown in FIG. 17, it is assumed here that L is 0 and F=0.

Optionally, the frequency domain resource position may be further cyclically shifted after being interleaved, for example, assuming that K2=mod(<1,5,3,7,0,4,2,6>+Q, K), the value of the cyclic shift Q can be determined in a way similar to the way the value of L is determined and is therefore not described here repeatedly.

In the example implementation process, another hopping rule is also provided which determines the following rule for the position mapping of resource units: interleaving, using an interleaver, a position sequence representing an unhopped discovery resource unit set and mapping a new position sequence resulting from the interleaving operation into positions of hopped discovery resource units.

Figure 18:
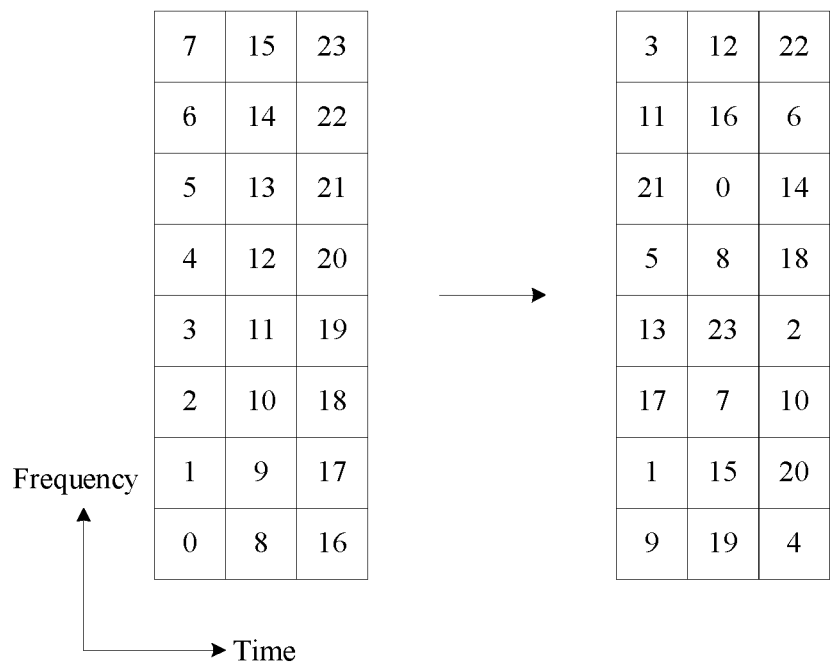
FIG. 18 is a schematic diagram illustrating an interleaving of a position sequence representing an unhopped discovery resource unit set using an interleaver according to an example embodiment of the disclosure.

FIG. 18 is a schematic diagram illustrating a interleaving of a position sequence representing an unhopped discovery resource unit set using an interleaver according to an example embodiment of the disclosure. As shown in FIG. 18, assuming that N=3, K=8 and the position number of each unhopped discovery resource element is P1, and P1=<0-23>, Then, a sequence obtained by numbering the discovery resource elements is interleaved using an interleaver. The interleaver may be an interleaver defined by an LTE system. A position number P2 is obtained from the interleaving of the sequence, and P2=<9, 1, 17, 13, 5, 21, 11, 3, 19, 15, 7, 23, 8, 0, 16, 12, 4, 20, 10, 2, 18, 14, 6, 22>. Then, each position number is converted into a hopped discovery resource unit in a time preference or frequency preference manner (in a frequency preference manner here).

Optionally, the resource position can be cyclically shifted after being interleaved, for example, after being cyclically shifted by R, the position sequence becomes mod(P2+R, N*K), in which the value of R can be determined in a way similar to the foregoing way the value of A is determined and is therefore not described here repeatedly.

Example Embodiment 6

As yet still another example implementation mode of the disclosure, the assignment of a specific resource is described.

In the example embodiment, a UE receives a specific radio resource control signaling sent by a network-side device, in which a parameter for indicating the position of a first resource is included in the specific radio resource control signaling.

In an example implementation process, the parameter for indicating the position of a first resource at least includes a parameter for indicating a frequency domain position and a parameter for indicating a time domain position.

Optionally, the frequency domain position can be indicated by a frequency domain index. For example, when there are Kd discovery resource units in each discovery subframe, then the resource units are represented with 0 to Kd−1 in ascending order of the frequency of the resource units. Alternatively, assigned discovery resource units are represented with 0 to Km−1, in which Km is a value determined according to a system bandwidth, for example, Km is determined according to the maximum system bandwidth (the maximum system bandwidth of LTE is 20 MHz or 100 RB). Alternatively, Km is determined according to the current system bandwidth which may be an LTE-permitted system bandwidth, for example, 5 MHz and 10 MHz; for example, assuming that the system bandwidth is 10 MHz and a D2D resource is located in an uplink frequency band and in an uplink subframe, because 50 RBs are included in an uplink frequency band, when the bandwidth of each discovery signal is 2 RBs, then at most 25 discovery resource units can be included on the same time resource in an uplink frequency band, that is, assigned discovery resource units are indicated by numbers 0 to 24 or 1 to 25 (e.g. the 25 values are indicated by 5 bits). Alternatively, Km may be determined using an available system bandwidth, for example, a discovery resource is located in an uplink frequency band or an uplink subframe, in this case, Physical Uplink Control Channel (PUCCH) resources are preserved at two sides of the uplink frequency band, the available system bandwidth refers to the resource bandwidth left after the PUCCH resources are removed.

Alternatively, a used frequency domain position is indicated using a bitmap. The length of the bitmap is the number of the discovery resource units in the frequency domain that are included in a configured discovery resource set; alternatively, the length of the bitmap may be determined according to the current system bandwidth, for example, in the foregoing examples, a 25-bit bitmap is used to indicate assigned discovery resource units; alternatively, the length of the bitmap may be determined according to an available system bandwidth.

Optionally, a time domain position is indicated using a time domain index; the time domain index indicates the position of a discovery resource unit in a discovery resource group (e.g. the position of a discovery resource unit the first discovery resource group in a D2D discovery period), for example, in the example shown in FIG. 10, subframe positions of assigned discovery resource units are indicated using 0 to 3 or 1 to 4 indexes; alternatively, the time domain index indicates the position of a discovery resource unit in a discovery resource period, for example, in the example shown in FIG. 10, subframe positions of assigned discovery resource units are indicated using 0 to 15 or 1 to 16 indexes; alternatively, the time domain index indicates the virtual resource position of a discovery resource unit, for example, in the example shown in FIG. 10, virtual time positions of assigned discovery resource units are indicated using 0 to 3 or 1 to 4 indexes.

Further, the time domain positions may be indicated using a bitmap.

Figure 19:
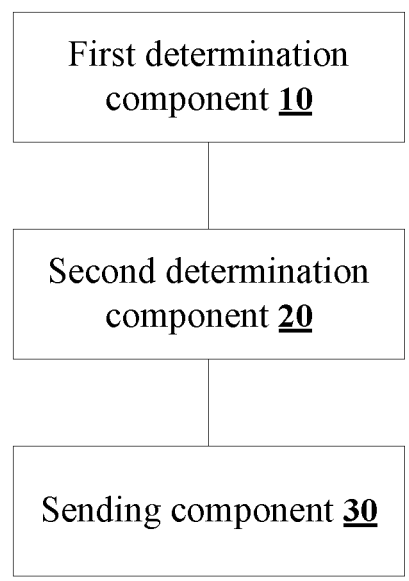
FIG. 19 is a structural block diagram illustrating a device for device-to-device communication according to an embodiment of the disclosure.

FIG. 19 is a structural block diagram illustrating a device for device-to-device communication according to an embodiment of the disclosure. As shown in FIG. 19, the device for device-to-device communication includes: a first determination component 10 arranged to determine a position of a first resource included in the D2D resources in a D2D resource period; a second determination component 20 arranged to determine a position of a second resource according to the position of the first resource and a predefined hopping rule, in which the predefined hopping rule includes at least one of the following rules: an inter-group hopping rule for establishing a D2D resource between D2D resource groups in the D2D resource period, and an inter-period hopping rule for establishing a D2D resource between adjacent D2D resource periods, in which the D2D resource groups are obtained by dividing the D2D resources in each D2D resource period through at least one of the ways: time division multiplexing and frequency division multiplexing; and a sending component 30 arranged to send a D2D signal on physical resources corresponding to the first resource and the second resource or on a physical resource corresponding to the second resource.

With the structure shown in FIG. 19, the device for device-to-device communication addresses the problem that the application of D2D is limited because UEs which send a discovery signal synchronously cannot discover each other due to the half-duplex characteristic of D2D communication and consequentially avoids the occurrence of a situation that UEs which send and monitor a discovery signal synchronously cannot discover each other and improves the universality of a method for device discovery.

In an example embodiment, in a case where the predefined hopping rule includes the inter-group hopping rule, the first resource and the second resource are in the same D2D resource period, the inter-group hopping rule is used for establishing a mapping relationship between resource positions of different D2D resource groups in the D2D resource period; when the D2D signal is to be sent in a plurality of D2D resource periods, at least one of the position of the first resource for sending the D2D signal in each of the plurality of D2D resource periods are the same, and the position of the second resource for sending the D2D signal in each of the plurality of D2D resource periods are the same; or at least one of the position of the first resource and the position of the second resource is determined in each of the plurality of D2D resource periods.

In an example embodiment, in a case where the predefined hopping rule includes the inter-period hopping rule, the first resource and the second resource are in different periods, and the inter-period hopping rule is used for establishing a mapping relationship between D2D resource positions in adjacent D2D resource periods, moreover a D2D resource position is a physical resource position or a virtual resource position, in a case where the D2D resource position is a virtual resource position, at least one of the followings is executed: a physical resource position corresponding to the first resource is determined according to the position of the first resource and a predefined D2D resource mapping rule; and a physical resource position corresponding to the second resource is determined according to the position of the second resource and the predefined D2D resource mapping rule.

In an example embodiment, the predefined D2D resource mapping rule is used for determining a physical resource position according to a virtual resource position, and the predefined D2D resource mapping rule is one of the following rules:

$$np(i)=i*\text{floor}(Np/Npg)+nv, kp(i)=kv; \quad (1)$$

$$np(i)=i*\text{floor}(Np/Npg)+nv, kp(i)=\text{mod}(i,2)*(Kp-kv-1)+\text{mod}(i+1,2)*kv; \quad (2)$$

$$np(i)=i*\text{floor}(Np/Npg)+nv, kp(i)=\text{mod}(\text{mod}(i,2)*\text{floor}(Kp/2)+kv, Kp); \text{ and} \quad (3)$$

$$np(i)=i*\text{floor}(Np/Npg)+nv, kp(i)=\text{mod}(i*\text{floor}(Kp/NUM)+kv, Kp); \quad (4)$$

in which NUM is a number of physical resources which send D2D signals from the same D2D sending source in a resource period; i is an index of a physical resource, and i=0, 1, 2, NUM−1; kp(i) and np(i) respectively represent a frequency domain position and a time domain position of a physical resource whose index is i; kv and nv respectively represent a frequency domain position and a time domain position of a virtual resource; Kp and Np respectively represent a number of the frequency domain resources and a number of time domain resources of a physical resource for D2D communication in a resource period; and Npg represents a number of physical resources of a D2D resource group in a time domain.

In an example embodiment, in a case where the predefined hopping rule includes both of the inter-group hopping rule and the inter-period hopping rule, the inter-group hopping rule is used for establishing a mapping rule between resource positions of D2D resource groups that are adjacent in the time domain to each other in a D2D resource period, and the inter-period hopping rule is used for establishing a mapping rule between resource positions of adjacent D2D resource groups in adjacent D2D resource periods; or, the inter-period hopping rule is used for establishing a mapping rule between resource positions of the first resource groups in adjacent D2D resource periods, moreover the adjacent D2D resource periods refer to D2D resource periods which are adjacent to each other in the time domain or D2D resource periods which are adjacent to each other in the time domain and in which the D2D signal is sent.

In a example implementation process, the inter-group hopping rule is the same as the inter-period hopping rule.

In an example embodiment, at least one of the inter-group hopping rule and the inter-period hopping rule is as follows: according to at least one of a time domain position index and a frequency domain position index of a D2D resource before hopping, at least one of the time domain position index and the frequency domain position index of a D2D resource after hopping is calculated, in which a principle corresponding to at least one of the inter-group hopping rule and the inter-period hopping rule includes at least one of the following principles of:

(1) a scattering processing for D2D resources having the same time domain position index through a hopping processing is executed; and (2) a frequency hopping processing for the frequency domain position of a D2D resource through a hopping processing is executed.

In an example embodiment, the mapping relationship between the D2D resource elements established according to at least one of the inter-group hopping rule and the inter-period hopping rule may be, but is not limited to be, one of the following mapping relationships:

$$k2=\text{mod}(\text{floor}((n1*K+k1+A+C)/N),K), n2=\text{mod}(n1*K+k1+A+D,N); \quad (1)$$

$$k2=\text{mod}(k1*N+n1+B+C,K), n2=\text{mod}(\text{floor}((k1*N+n1+B+D)/K),N); \quad (2)$$

$$k2=\text{mod}(k1+M+E,K), n2=\text{mod}(n1+k1+L+F,N); \quad (3)$$

$$k2=K-k1-1 \text{ or } k2=\text{mod}(K-k1-1+E,K), n2=\text{mod}(n1+k1+L+F,N); \quad (4)$$

frequency hopping is executed according to a type2 PUSCH hopping way defined by a Long Term Evolution (LTE), and a way of time domain hopping is as follows:

$$n2=\text{mod}(n1+k1+L+F,N); \text{ and} \quad (5)$$

unhopped frequency positions are interleaved using an interleaver and a frequency position of a D2D resource after hopping unit is obtained according to a result of interleaving, and a way of time domain hopping is as follows:

$$n2=\mod(n1+k1+L+F,N), \qquad (6)$$

in which floor(a) represents a rounddown of a; mod(a,b) represents a modulo operation for a dividend of a and a divisor of b; n1 and k1 are respectively corresponding to a time position and a frequency position of a D2D resource before hopping; n2 and k2 are respectively corresponding to a time position and a frequency position of a D2D resource after hopping; N represents a number of the D2D resources that are included in a D2D resource group or a D2D resource period in a direction of time; K represents a number of the D2D resources that are included in a D2D resource group or a D2D resource period in a direction of frequency; A, B, C, D, E, F, M and L are all integers; and a position of the D2D resource is a physical resource position or a virtual resource position.

In an example embodiment, the number of the D2D resource groups in a D2D resource period may be, but is not limited to be, one of the following numbers:

(1) a preset number;

(2) a number indicated by a D2D configuration signaling sent by a network-side device; and (3) a number determined according to times a D2D signal is sent repeatedly in a D2D resource period.

In an example embodiment, the D2D signal may include, but is not limited to be, one of the following signals:

(1) a signal for transmitting a D2D discovery message;

(2) a signal for transmitting a D2D communication control signaling;

(3) a signal for transmitting D2D communication data; and (4) a signal for transmitting D2D synchronization.

In an example embodiment, the first determination component 10 is arranged to determine the position of the first resource in one of the following ways: receiving, from a network-side device, a control signaling for indicating the position of the first resource; randomly selecting the position of the first resource from a D2D resource set in a D2D resource period, in which the D2D resource set is a part of or all of the D2D resource groups in the D2D resource period; receiving a control signaling sent from a network-side device and determining the position of the first resource according to the control signaling and the predefined hopping rule; determining the position of the first resource according to the identification information of a UE; and indicating the position of the first resource using a D2D control signaling sent by another UE.

In an example embodiment, the first determination component 10 is arranged to receive a specific radio resource control signaling from the network-side device and determine the position of the first resource according to the specific radio resource control signaling, moreover the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

In an example embodiment, the first determination component 10 is arranged to receive a specific radio resource control signaling from a network-side device and determine the position of the first resource according to the specific radio resource control signaling, moreover the specific radio resource control signaling carries parameters for indicating a position of a specific D2D resource unit, the position of the specific D2D resource unit is a position of the specific D2D resource unit in a first D2D resource period, and the first D2D resource period is indicated by configuration information, or the first D2D resource period is a D2D resource period for first sending the D2D signal sending; and the first determination component 10 is further arranged to determine the position of the first resource according to the position of the specific D2D resource element in the first D2D resource period and the predefined hopping rule.

As a example embodiment of the disclosure, a radio communication system capable of realizing D2D discovery in a cellular communication system is provided in the example embodiment.

Figure 20:
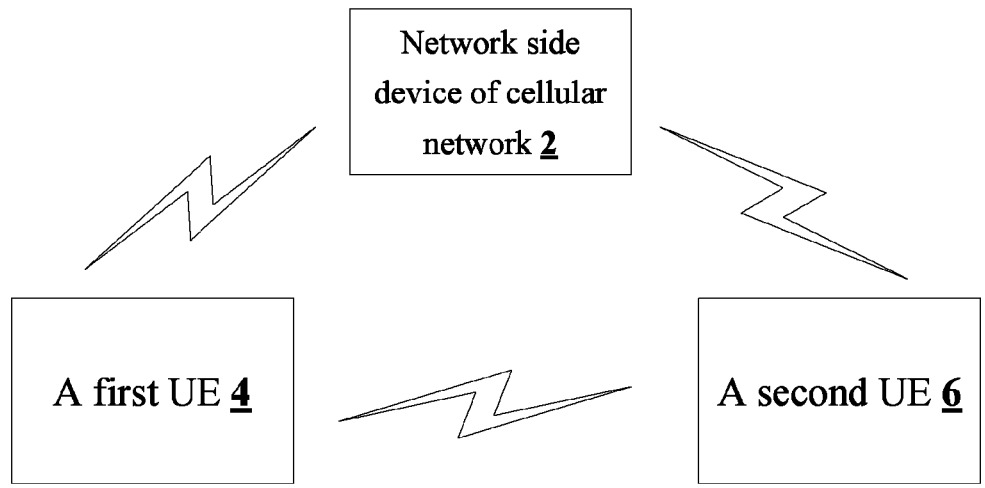
FIG. 20 is a schematic diagram illustrating a structure of a radio communication system according to an example embodiment of the disclosure.

FIG. 20 is a schematic diagram illustrating a structure of a radio communication system according to an example embodiment of the disclosure. As shown in FIG. 20, the radio communication system may include: a network-side device of a cellular network 2, a first UE 4 and a second UE 6.

In the example embodiment, the network-side device of a cellular network 2 may include a device for controlling device-to-device communication which is at least used for configuring a D2D resource. Optionally, the network-side device 2 may include: a configuration component (not shown in FIG. 20) arranged to configure configuration information of D2D communication; and a sending component (not shown in FIG. 20) arranged to send the configuration information, moreover the configuration information carries configuration parameters of D2D communication, and the configuration parameters may include, but are not limited to: parameters for indicating a radio resource for device communication, for example, parameters for indicating device discovery resources, parameters for indicating a D2D control signaling (SA) resource, parameter for indicating a D2D data channel resource, and so on. For example, a device discovery resource is configured periodically, and the radio resource for device discovery in each discovery resource period is divided into discovery resource units through at least one of time division multiplexing and frequency division multiplexing. A time length of the discovery resource unit can be determined as slots or sub-frames, for example, a time length of a discovery resource unit is one or two sub-frames; and a frequency bandwidth of the discovery resource unit can be determined as resource blocks, for example, the frequency bandwidth of a discovery resource unit is 2 or 3 resource blocks.

Optionally, the network-side device 2 may be one of the following devices:

(1) a base station (or eNB);

(2) another network access device, for example, a small cell;

(3) a network node of a higher layer, e.g. a gateway;

(4) a Mobility Management Entity (MME);

(5) another server or network element providing D2D services;

(6) a network element temporarily deployed in an out-of-network scenario; and (7) a UE functioning as a Cluster Head or a Primary UE in, for example, an out-of-network scenario.

Optionally, the first UE 4 may include: a first communication component (not shown in FIG. 20) arranged to receive device discovery configuration information from a network node, in which the configuration information is used for indicating a radio resource for device discovery, the radio resource for device discovery is periodic, and radio resources for device discovery existing in each discovery resource period may further be grouped; a processing component (not shown in FIG. 20) arranged to determine a discovery resource unit for sending a device discovery signal in a discovery resource period; and a second communication component (not shown in FIG. 20) arranged to send a device discovery signal on the determined discovery resource unit.

Optionally, the second UE 6 may detect a device discovery signal.

Figure 21:
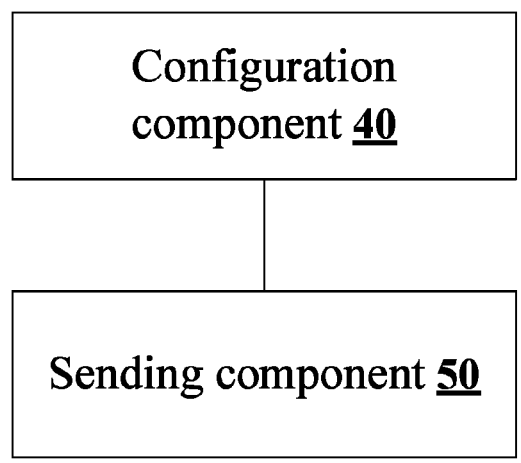
FIG. 21 is a structural block diagram illustrating a device for controlling device-to-device communication according to an embodiment of the disclosure.

FIG. 21 is a structural block diagram illustrating a device for controlling device-to-device communication according to an embodiment of the disclosure. As shown in FIG. 21, the device may include: a configuration component 40 arranged to configure a periodic D2D communication resource; a sending component 50 arranged to send a configuration signaling according to the periodic D2D communication resource, moreover at least one of there is a mapping relationship between D2D resources in adjacent D2D resource periods, and the mapping relationship is determined based on an inter-period hopping rule; and there is a mapping relationship between D2D resources included in a D2D resource group in a D2D resource period, and the mapping relationship is determined based on an inter-group hopping rule; moreover, at least one of the inter-period hopping rule and the inter-group hopping rule is used by a UE to determine a position of a second resource according to a position of a first resource, in which the first resource and the second resource are used by the UE to send a D2D signal, or the second resource is used by the UE to send a D2D signal.

In an example embodiment, at least one of the inter-group hopping rule and the inter-period hopping rule is as follows: according to at least one of a time domain position index and a frequency domain position index of a D2D resource before hopping, at least one of a time domain position index and a frequency domain position index of a D2D resource after hopping is calculated, moreover a principle corresponding to at least one of a inter-group hopping rule and the inter-period hopping rule includes at least one of the following principles of: executing a scattering processing for D2D resources having the same time domain position index through a hopping processing; and executing a frequency hopping processing for a frequency domain position of a D2D resource through a hopping processing.

In an example embodiment, the inter-group hopping rule is the same as the inter-period hopping rule.

In an example embodiment, the mapping relationship between the D2D resource units established according to at least one of the inter-group hopping rule and the inter-period hopping rule is one of the following mapping relationships:

$$k2=\mod(\text{floor}((n1*K+k1+A+C)/N),K), n2=\mod(n1*K+k1+A+D,N); \quad (1)$$

$$k2=\mod(k1*N+n1+B+C,K), n2=\mod(\text{floor}((k1*N+n1+B+D)/K),N); \quad (2)$$

$$k2=\mod(k1+M+E,K), n2=\mod(n1+k1+L+F,N); k2=K-k1-1 \text{ or } k2=\mod(K-k1-1+E,K), n2=\mod(n1+k1+L+F,N); \quad (3)$$

frequency hopping is executed according to a type2 PUSCH hopping way defined by a Long Term Evolution (LTE), and a way of time domain hopping is as follows:

$$n2=\mod(n1+k1+L+F,N); \text{ and} \quad (4)$$

unhopped frequency positions are interleaved using an interleaver and a frequency position of a D2D resource after hopping unit is obtained according to a result of interleaving, and a way of time domain hopping is as follows:

$$n2=\mod(n1+k1+L+F,N), \quad (5)$$

in which floor(a) represents a rounddown of a; mod(a,b) represents a modulo operation for a dividend of a and a divisor of b; n1 and k1 are respectively corresponding to a time position and a frequency position of a D2D resource before hopping; n2 and k2 are respectively corresponding to a time position and a frequency position of a D2D resource after hopping; N represents a number of the D2D resources that are included in a D2D resource group or a D2D resource period in a direction of time; K represents a number of the D2D resources that are included in a D2D resource group or a D2D resource period in a direction of frequency; A, B, C, D, E, F, M and L are all integers; and a position of the D2D resource is a physical resource position or a virtual resource position.

In an example embodiment, the number of the D2D resource groups in a D2D resource period is one of the following numbers:

(1) a preset number;

(2) a number indicated by a D2D configuration signaling sent by a sending component; and (3) a number determined according to the times a D2D signal is sent repeatedly in a D2D resource period.

In an example embodiment, the D2D signal includes one of the following signals:

(1) a signal for transmitting a D2D discovery message;

(2) a signal for transmitting a D2D communication control signaling;

(3) a signal for transmitting D2D communication data; and (4) a signal for transmitting D2D synchronization.

In an example embodiment, the sending component 50 is arranged to send a control signaling for indicating the position of the first resource; alternatively, the sending component 50 is arranged to send a control signaling, in which the control signaling is used together with at least one of the inter-period hopping rule and the inter-group hopping rule for a UE to determine the position of the first resource.

In an example embodiment, the sending component 50 is arranged to send a specific radio resource control signaling for indicating the position of the first resource, moreover the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

It can be seen from the foregoing description that the embodiments realize the following technical effects (it should be noted that the effects are achievable to some example embodiments): by adopting the technical solutions provided in embodiments of the disclosure, the situation is avoided that UEs which send and monitor a discovery signal synchronously cannot discover each other, and the universality of a method for device discovery is consequentially improved. Additionally, by grouping the resources in the discovery resource period and establishing the mapping rule between discovery resource groups, the utilization efficiency of a radio resource is improved further, and a performance of cellular communication is enhanced.

Apparently, it should be appreciated by those skilled in the art that each component or step described in the disclosure can be realized by a universal computer and that the components or steps may be integrated on a single computer or distributed on a network consisting of a plurality of computers, optionally, the components or steps may be realized by executable program codes so that the components or steps can be stored in a memory to be executed by a computer, and in some cases, the steps shown or described herein can be executed in a sequence different from this presented herein, or the components or steps are formed into integrated circuit components, or several of the components or steps are formed into integrated circuit components. Therefore, the disclosure is not limited to the combination of specific hardware and software.

Although certain example embodiments of the disclosure have been described above, it should be appreciated that the example embodiments are not described for limiting the disclosure and that a variety of modifications and variations can be devised by those of ordinary skill in the art. Any modification, equivalent substitute and improvement that can be devised by those of ordinary skill in the art without departing from the spirit of the disclosure and that the modifications and improvements shall fall within the protection scope of the disclosure.

INDUSTRIAL APPLICABILITY

As stated above, the method and device for device to device communication and the device for controlling the device to device communication provided in embodiments of the disclosure realize the following beneficial effect: the situation is avoided that UEs which send and monitor the discovery signal synchronously cannot discover each other, and the universality of the method for device discovery is consequentially improved. Additionally, by grouping the resources in the discovery resource period and establishing the mapping rule between discovery resource groups, the utilization efficiency of the radio resource is further improved, and the performance of cellular communication is enhanced.

What is claimed is:

1. A method for device-to-device communication, comprising:
    determining a position of a first resource included in Device-to-Device (D2D) resources in a D2D resource period;
    determining a position of a second resource according to the position of the first resource and a predefined hopping rule, wherein the predefined hopping rule includes at least one of the following rules: an inter-group hopping rule for establishing a D2D resource between D2D resource groups in the D2D resource period, and an inter-period hopping rule for establishing a D2D resource between adjacent D2D resource periods, wherein the D2D resource groups are obtained by dividing the D2D resources in each D2D resource period through at least one of the ways: time division multiplexing and frequency division multiplexing; and
    sending a D2D signal on physical resources corresponding to the first resource and the second resource or on a physical resource corresponding to the second resource.

2. The method as claimed in claim 1, wherein at least one of the inter-group hopping rule and the inter-period hopping rule is as follows, according to at least one of a time domain position index and a frequency domain position index of a D2D resource before hopping, at least one of the time domain position index and the frequency domain position index of a D2D resource after hopping is calculated, wherein a principle corresponding to at least one of the inter-group hopping rule and the inter-period hopping rule includes at least one of the following principles of: executing a scattering processing for D2D resources having the same time domain position index through a hopping processing; and executing a frequency hopping processing for the frequency domain position of a D2D resource through a hopping processing:
    or in a case where the predefined hopping rule includes the inter-group hopping rule, the first resource and the second resource are in the same D2D resource period, and the inter-group hopping rule is used for establishing a mapping relationship between resource positions of different D2D resource groups in the D2D resource period; when the D2D signal is to be sent in a plurality of D2D resource periods, at least one of the position of the first resource for sending the D2D signal in each of the plurality of D2D resource periods are the same and the position of the second resource for sending the D2D signal in each of the plurality of D2D resource periods are the same; or at least one of the position of the first resource and the position of the second resource is determined in each of the plurality of D2D resource periods;
    or in a case where the predefined hopping rule includes the inter-period hopping rule, the first resource and the second resource are in different periods, and the inter-period hopping rule is used for establishing a mapping relationship between D2D resource positions in adjacent D2D resource periods, wherein a D2D resource position is a physical resource position or a virtual resource position; in a case where the D2D resource position is a virtual resource position, at least one of the followings is executed: a physical resource position corresponding to the first resource is determined according to the position of the first resource and a predefined D2D resource mapping rule; and a physical resource position corresponding to the second resource is determined according to the position of the second resource and the predefined D2D resource mapping rule; and the adjacent D2D resource periods refer to D2D resource periods which are adjacent to each other in a time domain or D2D resource periods which are adjacent to each other in a time domain and in which the D2D signal is sent;
    or in a case where the predefined hopping rule includes both of the inter-group hopping rule and the inter-period hopping rule, the inter-group hopping rule is used for establishing a mapping rule between resource positions of D2D resource groups that are adjacent in the time domain to each other in a D2D resource period, and the inter-period hopping rule is used for establishing a mapping rule between resource positions of D2D resource groups that are adjacent to each other in adjacent D2D resource periods; or, the inter-period hopping rule is used for establishing a mapping rule between resource positions of the first D2D resource groups in adjacent D2D resource periods, wherein the adjacent D2D resource periods refer to D2D resource periods which are adjacent to each other in the time domain or D2D resource periods which are adjacent to each other in the time domain and in which the D2D signal is sent.

3. The method as claimed in claim 2, wherein the predefined D2D resource mapping rule is used for determining a physical resource position according to a virtual resource position, and the predefined D2D resource mapping rule is one of the following rules:

$$np(i)=i*\text{floor}(Np/Npg)+nv, kp(i)=kv;$$

$$np(i)=i*\text{floor}(Np/Npg)+nv, kp(i)=\text{mod}(i,2)*(Kp-kv-1)+\text{mod}(i+1,2)*kv;$$

$$np(i)=i*\text{floor}(Np/Npg)+nv, kp(i)=\text{mod}(\text{mod}(i,2)*\text{floor}(Kp/2)+kv, Kp); \text{ and}$$

$$np(i)=i*\text{floor}(Np/Npg)+nv, kp(i)=\text{mod}(i*\text{floor}(Kp/\text{NUM})+kv, Kp),$$

wherein NUM is a number of physical resources which send D2D signals from the same D2D sending source in a resource period; i is an index of a physical resource and i=0, 1, 2, NUM−1; kp(i) and np(i) respectively represent a frequency domain position and a time domain position of a physical resource whose index is i; kv and nv respectively represent a frequency domain position and a time domain position of a virtual resource; Kp and Np respectively represent a number of frequency domain resources and a number of time domain resources of a physical resource for D2D communication in a resource period; and Npg represents a number of physical resources of a D2D resource group in a time domain.

4. The method as claimed in claim 2, wherein the inter-group hopping rule is the same as the inter-period hopping rule.

5. The method as claimed in claim 1, wherein the mapping relationship between the D2D resource units established according to at least one of the inter-group hopping rule and the inter-period hopping rule is one of the following mapping relationships:

$$k2=\text{mod}(\text{floor}((n1*K+k1+A+C)/N),K), n2=\text{mod}(n1*K+k1+A+D,N)$$

$$k2=\text{mod}(k1*N+n1+B+C,K), n2=\text{mod}(\text{floor}((k1*N+n1+B+D)/K),N);$$

$$k2=\text{mod}(k1+M+E,K), n2=\text{mod}(n1+k1+L+F,N);$$

$$k2=K-k1-1 \text{ or } k2=\text{mod}(K-k1-1+E,K), n2=\text{mod}(n1+k1+L+F,N);$$

wherein frequency hopping is executed according to a type2 Physical Uplink Shared Channel (PUSCH) hopping way defined by a Long Term Evolution (LTE), and a way of time domain hopping is as follows: n2=mod(n1+k1+L+F,N); and unhopped frequency positions are interleaved using an interleaver and a frequency position of a D2D resource after hopping unit is obtained according to a result of interleaving, and a way of time domain hopping is as follows: n2=mod(n1+k1+L+F,N), wherein floor(a) represents a rounddown of a; mod(a,b) represents a modulo operation between a and b; n1 and k1 are respectively corresponding to a time position and a frequency position of a D2D resource before hopping; n2 and k2 are respectively corresponding to a time position and a frequency position of a D2D resource after hopping; N represents a number of D2D resources that are included in a D2D resource group or a D2D resource period in a direction of time; K represents a number of D2D resources that are included in a D2D resource group or a D2D resource period in a direction of frequency; A, B, C, D, E, F, M and L are all integers; and a position of the D2D resource is a physical resource position or a virtual resource position;

or a number of the D2D resource groups in a D2D resource period is one of the followings:
a preset number;
a number indicated by a D2D configuration signaling sent by a network-side device; and
a number determined according to times a D2D signal is sent repeatedly in a D2D resource period;
or the D2D signal includes one of the following signals;
a signal for transmitting a D2D discovery message;
a signal for transmitting a D2D communication control signaling;
a signal for transmitting D2D communication data; and
a signal for transmitting D2D synchronization;
or a way of determining the position of the first resource is one of the followings:
receiving, from a network-side device, a control signaling for indicating the position of the first resource;
randomly selecting the position of the first resource from a D2D resource set in a D2D resource period, wherein the D2D resource set is a part of or all of the D2D resource groups in the D2D resource period;
receiving a control signaling sent from a network-side device and determining the position of the first resource according to the control signaling and the predefined hopping rule;
determining the position of the first resource according to identification information of a User Equipment (UE); and
indicating the position of the first resource using a D2D control signaling sent by another UE.

6. The method as claimed in claim 5, wherein receiving, from the network-side device, the control signaling for indicating the position of the first resource comprises:
receiving a specific radio resource control signaling from the network-side device and determining the position of the first resource according to the specific radio resource control signaling, wherein
the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

7. The method as claimed in claim 5, wherein receiving the control signaling sent from the network-side device and determining the position of the first resource according to the control signaling and the predefined hopping rule comprises:
receiving a specific radio resource control signaling from the network-side device and determining the position of the first resource according to the specific radio resource control signaling, wherein
the specific radio resource control signaling carries parameters for indicating a position of a specific D2D resource unit, the position of the specific D2D resource unit is a position of the specific D2D resource unit in a first D2D resource period, and the first D2D resource period is indicated by configuration information, or the first D2D resource period is a D2D resource period for first sending the D2D signal; and
determining the position of the first resource according to the position of the specific D2D resource unit in the first D2D resource period and the predefined hopping rule.

8. A device for device-to-device communication, comprising:
a first determination component arranged to determine a position of a first resource included in the Device-to-Device (D2D) resources in a D2D resource period;
a second determination component arranged to determine a position of a second resource according to the position of the first resource and a predefined hopping rule, wherein the predefined hopping rule includes at least one of the following rules: an inter-group hopping rule for establishing a D2D resource between D2D resource groups in the D2D resource period, and an inter-period hopping rule for establishing a D2D resource between adjacent D2D resource periods, wherein the D2D resource groups are obtained by dividing the D2D resources in each D2D resource period through at least one of the ways: time division multiplexing and frequency division multiplexing; and
a sending component arranged to send a D2D signal on physical resources corresponding to the first resource and the second resource or on a physical resource corresponding to the second resource.

9. The device as claimed in claim 8, wherein at least one of the inter-group hopping rule and the inter-period hopping rule is as follows: according to at least one of a time domain position index and a frequency domain position index of a D2D resource before hopping, at least one of the time domain position index and the frequency domain position index of a D2D resource after hopping is calculated, wherein a principle corresponding to at least one of the inter-group hopping rule and the inter-period hopping rule includes at least one of the following principles of: executing a scattering processing for D2D resources having the same time domain position index through a hopping processing; and executing a frequency hopping processing for the frequency domain position of a D2D resource through a hopping processing or in a case where the predefined hopping rule includes the inter-group hopping rule, the first resource and the second resource are in the same D2D resource period, the inter-group hopping rule is used for establishing a mapping relationship between resource positions of different D2D resource groups in the D2D resource period; when the D2D signal is to be sent in a plurality of D2D resource periods, at least one of the position of the first resource for sending the D2D signal in each of the plurality of D2D resource periods are the same, and the position of the second resource for sending the D2D signal in each of the plurality of D2D resource periods are the same; or at least one of the position of the first resource and the position of the second resource is determined in each of the plurality of D2D resource periods;

or in a case where the predefined hopping rule includes the inter-period hopping rule, the first resource and the second resource are in different periods, and the inter-period hopping rule is used for establishing a mapping relationship between D2D resource positions in adjacent D2D resource periods, wherein a D2D resource position is a physical resource position or a virtual resource position, in a case where the D2D resource position is a virtual resource position, at least one of the followings is executed: a physical resource position corresponding to the first resource is determined according to the position of the first resource and a predefined D2D resource mapping rule; and a physical resource position corresponding to the second resource is determined according to the position of the second resource and the predefined D2D resource mapping rule; and the adjacent D2D resource periods refer to D2D resource periods which are adjacent to each other in a time domain or D2D resource periods which are adjacent to each other in a time domain and in which the D2D signal is sent;

or in a case where the predefined hopping rule includes both of the inter-group hopping rule and the inter-period hopping rule, the inter-group hopping rule is used for establishing a mapping rule between resource positions of D2D resource groups that are adjacent in the time domain to each other in a D2D resource period, and the inter-period hopping rule is used for establishing a mapping rule between resource positions of D2D resource groups that are adjacent to each other in adjacent D2D resource periods; or, the inter-period hopping rule is used for establishing a mapping rule between resource positions of the first resource groups in adjacent D2D resource periods, wherein the adjacent D2D resource periods refer to D2D resource periods which are adjacent to each other in the time domain or D2D resource periods which are adjacent to each other in the time domain and in which the D2D signal is sent.

10. The device as claimed in claim 9, wherein the predefined D2D resource mapping rule is used for determining a physical resource position according to a virtual resource position, and the predefined D2D resource mapping rule is one of the following rules:

$$np(i)=i*\text{floor}(Np/Npg)+nv, kp(i)=kv;$$

$$np(i)=i*\text{floor}(Np/Npg)+nv, kp(i)=\text{mod}(i,2)*(Kp-kv-1)+\text{mod}(i+1,2)*kv;$$

$$np(i)=i*\text{floor}(Np/Npg)+nv, kp(i)=\text{mod}(\text{mod}(i,2)*\text{floor}(Kp/2)+kv, Kp); \text{ and}$$

$$np(i)=i*\text{floor}(Np/Npg)+nv, kp(i)=\text{mod}(i*\text{floor}(Kp/\text{NUM})+kv, Kp),$$

wherein NUM is a number of physical resources which send D2D signals from the same D2D sending source in a resource period; i is an index of a physical resource and i=0, 1, 2, NUM−1; kp(i) and np(i) respectively represent a frequency domain position and a time domain position of a physical resource whose index is i; kv and nv respectively represent a frequency domain position and a time domain position of a virtual resource; Kp and Np respectively represent a number of the frequency domain resources and a number of time domain resources of a physical resource for D2D communication in a resource period; and Npg represents a number of physical resources of a D2D resource group in a time domain.

11. The device as claimed in claim 9, wherein the inter-group hopping rule is the same as the inter-period hopping rule.

12. The device as claimed in claim 8, wherein the mapping relationship between the D2D resource units established according to at least one of the inter-group hopping rule and the inter-period hopping rule is one of the following mapping relationships:

$$k2=\text{mod}(\text{floor}((n1*K+k1+A+C)/N),K), n2=\text{mod}(n1*K+k1+A+D,N);$$

$$k2=\text{mod}(k1*N+n1+B+C,K), n2=\text{mod}(\text{floor}((k1*N+n1+B+D)/K),N);$$

$k2=\mod(k1+M+E,K), n2=\mod(n1+k1+L+F,N);$ $k2=K-k1-1$ or $k2=\mod(K-k1-1+E,K), n2=\mod(n1+k1+L+F,N);$ wherein frequency hopping is executed according to a type2 Physical Uplink Shared Channel (PUSCH) hopping way defined by a Long Term Evolution (LTE), and a way of time domain hopping is as follows: n2=mod(n1+k1+L+F,N); and unhopped frequency positions are interleaved using an interleaver and a frequency position of a D2D resource after hopping unit is obtained according to a result of interleaving, and a way of time domain hopping is as follows: n2=mod(n1+k1+L+F,N), wherein floor(a) represents a rounddown of a; mod(a,b) represents a modulo operation between a and b; n1 and k1 are respectively corresponding to a time position and a frequency position of a D2D resource before hopping; n2 and k2 are respectively corresponding to a time position and a frequency position of a D2D resource after hopping; N represents a number of D2D resources that are included in a D2D resource group or a D2D resource period in a direction of time; K represents a number of D2D resources that are included in a D2D resource group or a D2D resource period in a direction of frequency; A, B, C, D, E, F, M and L are all integers; and a position of the D2D resource is a physical resource position or a virtual resource position;

or the number of the D2D resource groups in a D2D resource period is one of the following numbers:

a preset number;

a number indicated by a D2D configuration signaling sent by a network-side device; and a number determined according to times a D2D signal is sent repeatedly in a D2D resource period;

or the D2D signal includes one of the following signals;

a signal for transmitting a D2D discovery message;

a signal for transmitting a D2D communication control signaling;

a signal for transmitting D2D communication data; and a signal for transmitting D2D synchronization;

or the first determination component is arranged to determine the position of the first resource in one of the following ways:

receiving, from a network-side device, a control signaling for indicating the position of the first resource;

randomly selecting the position of the first resource from a D2D resource set in a D2D resource period, wherein the D2D resource set is a part of or all of the D2D resource groups in the D2D resource period;

receiving a control signaling sent from a network-side device and determining the position of the first resource according to the control signaling and the predefined hopping rule;

determining the position of the first resource according to identification information of a User Equipment (UE); and indicating the position of the first resource using a D2D control signaling sent by another UE.

13. The device as claimed in claim 12, wherein the first determination component is arranged to receive a specific radio resource control signaling from the network-side device and determine the position of the first resource according to the specific radio resource control signaling, wherein the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

14. The device as claimed in claim 12, wherein the first determination component is arranged to receive a specific radio resource control signaling from a network-side device and determine the position of the first resource according to the specific radio resource control signaling, wherein the specific radio resource control signaling carries parameters for indicating a position of a specific D2D resource unit, the position of the specific D2D resource unit is a position of the specific D2D resource unit in a first D2D resource period, and the first D2D resource period is indicated by configuration information, or the first D2D resource period is a D2D resource period for first sending the D2D signal; and the first determination component is further arranged to determine the position of the first resource according to the position of the specific D2D resource unit in the first D2D resource period and the predefined hopping rule.

15. A device for controlling device-to-device communication, comprising:

a configuration component arranged to configure a periodic Device-to-Device (D2D) communication resource; and a sending component arranged to send a configuration signaling according to the periodic D2D communication resource, wherein at least one of there is a mapping relationship between D2D resources in adjacent D2D resource periods, and the mapping relationship is determined based on an inter-period hopping rule; and there is a mapping relationship between D2D resources included in a D2D resource group in a D2D resource period, and the mapping relationship is determined based on an inter-group hopping rule;

wherein at least one of the inter-period hopping rule and the inter-group hopping rule is used by a User Equipment (UE) to determine a position of a second resource according to a position of a first resource, wherein the first resource and the second resource are used by the UE to send a D2D signal, or the second resource is used by the UE to send a D2D signal.

16. The device as claimed in claim 15, wherein at least one of the inter-group hopping rule and the inter-period hopping rule is as follows: according to at least one of a time domain position index and a frequency domain position index of a D2D resource before hopping, at least one of a time domain position index and a frequency domain position index of a D2D resource after hopping is calculated, wherein a principle corresponding to at least one of the inter-group hopping rule and the inter-period hopping rule includes at least one of the following principles of: executing a scattering processing for D2D resources having the same time domain position index through a hopping processing; and executing a frequency hopping processing for a frequency domain position of a D2D resource through a hopping processing;

or a mapping relationship between the D2D resource units established according to at least one of the inter-group hopping rule and the inter-period hopping rule is one of the following mapping relationships:

$$k2=\mathrm{mod}(\mathrm{floor}((n1*K+k1+A+C)/N),K), n2=\mathrm{mod}(n1*K+k1+A+D,N);$$

$$k2=\mathrm{mod}(k1*N+n1+B+C,K), n2=\mathrm{mod}(\mathrm{floor}((k1*N+n1+B+D)/K),N);$$

$$k2=\mathrm{mod}(k1+M+E,K), n2=\mathrm{mod}(n1+k1+L+F,N);$$

$$k2=K-k1-1 \text{ or } k2=\mathrm{mod}(K-k1-1+E,K), n2=\mathrm{mod}(n1+k1+L+F,N);$$

wherein frequency hopping is executed according to a type2 Physical Uplink Shared Channel (PUSCH) hopping way defined by a Long Term Evolution (LTE), and a way of time domain hopping is as follows: n2=mod(n1+k1+L+F,N); and unhopped frequency positions are interleaved using an interleaver and a frequency position of a D2D resource after hopping unit is obtained according to a result of interleaving, and a way of time domain hopping is as follows: n2=mod(n1+k1+L+F,N), wherein floor(a) represents a rounddown of a; mod(a,b) represents a modulo operation between a and b; n1 and k1 are respectively corresponding to a time position and a frequency position of a D2D resource before hopping; n2 and k2 are respectively corresponding to a time position and a frequency position of a D2D resource after hopping; N represents a number of D2D resources that are included in a D2D resource group or a D2D resource period in a direction of time; K represents a number of D2D resources that are included in a D2D resource group or a D2D resource period in a direction of frequency; AB C, D, E, F M and L are all integers; and a position of the D2D resource is a physical resource position or a virtual resource position.

17. The device as claimed in claim 16, wherein the inter-group hopping rule is the same as the inter-period hopping rule.

18. The device as claimed in claim 15, wherein the number of the D2D resource groups in a D2D resource period is one of the following numbers:
a preset number;
a number indicated by a D2D configuration signaling sent by the sending component; and
a number determined according to the times a D2D signal is sent repeatedly in a D2D resource period;
or the D2D signal includes one of the following signals;
a signal for transmitting a D2D discovery message;
a signal for transmitting a D2D communication control signaling;
a signal for transmitting D2D communication data; and
a signal for transmitting D2D synchronization;
or the sending component is arranged to send a control signaling for indicating the position of the first resource; alternatively, the sending component is arranged to send a control signaling, wherein the control signaling is used together with at least one of the inter-period hopping rule and the inter-group hopping rule for a UE to determine the position of the first resource.

19. The device as claimed in claim 18, wherein the sending component is arranged to send a specific radio resource control signaling for indicating the position of the first resource, wherein
the specific radio resource control signaling carries parameters for indicating the position of the first resource, the parameters respectively indicate a time domain position and a frequency domain position of the first resource, or the parameters simultaneously indicate a time-time domain position and a frequency domain position of the first resource.

* * * * *